(12) United States Patent
Ramezani et al.

(10) Patent No.: US 11,361,449 B2
(45) Date of Patent: Jun. 14, 2022

(54) NEURAL NETWORK FOR OBJECT DETECTION AND TRACKING

(71) Applicant: LUMINAR, LLC, Orlando, FL (US)

(72) Inventors: Vahid R. Ramezani, Los Altos, CA (US); Akshay Rangesh, San Diego, CA (US); Benjamin Englard, Palo Alto, CA (US); Siddhesh S. Mhatre, Foster City, CA (US); Meseret R. Gebre, Palo Alto, CA (US); Pranav Maheshwari, Palo Alto, CA (US)

(73) Assignee: Luminar, LLC, Orlando, FL (US)

( * ) Notice: Subject to any disclaimer, the term of this patent is extended or adjusted under 35 U.S.C. 154(b) by 40 days.

(21) Appl. No.: 17/013,446

(22) Filed: Sep. 4, 2020

(65) Prior Publication Data

US 2022/0076432 A1    Mar. 10, 2022

Related U.S. Application Data

(60) Provisional application No. 63/021,087, filed on May 6, 2020.

(51) Int. Cl.
| | |
|---|---|
| *G06T 7/246* | (2017.01) |
| *G06T 7/73* | (2017.01) |
| *G06N 3/04* | (2006.01) |
| *G06N 3/08* | (2006.01) |

(52) U.S. Cl.
CPC ........... *G06T 7/246* (2017.01); *G06N 3/0445* (2013.01); *G06N 3/08* (2013.01); *G06T 7/73* (2017.01); *G06T 2207/10016* (2013.01); *G06T 2207/20081* (2013.01); *G06T 2207/20084* (2013.01)

(58) Field of Classification Search
CPC ......... G06T 7/246; G06T 7/73; G06N 3/0445; G06N 3/08
See application file for complete search history.

(56) References Cited

U.S. PATENT DOCUMENTS

| | | | |
|---|---|---|---|
| 9,760,806 B1 | 9/2017 | Ning et al. | |
| 2021/0103706 A1* | 4/2021 | Yu | G06N 3/0454 |
| 2021/0158161 A1* | 5/2021 | Louizos | G06N 3/082 |
| 2021/0287067 A1* | 9/2021 | Zavoronkovs | G06N 3/084 |

OTHER PUBLICATIONS

Ramezani, "Causal Event Networks: Cognition, Complexity and Physical Laws," arXiv:1402.7038v1 [q-bio.NC] Feb. 26, 2014.
Braso et al. "Learning a Neural Solver for Multiple Object Tacking," arXiv: 1912.07515v2 [cs.CV] Apr. 18, 2020.

(Continued)

*Primary Examiner* — Vikkram Bali

(57) ABSTRACT

A method for multi-object tracking includes receiving a sequence of images generated at respective times by one or more sensors configured to sense an environment through which objects are moving relative to the one or more sensors, and constructing a message passing graph in which each of a multiplicity of layers corresponds to a respective one in the sequence of images. The method also includes tracking multiple features through the sequence of images, including passing messages in a forward direction and a backward direction through the message passing graph to share information across time.

20 Claims, 14 Drawing Sheets

(56) References Cited

OTHER PUBLICATIONS

Rangesh et al., "TrackMPNN: A Message Passing Graph Neural Architecture for Multi-Object Tracking," arXiv:2101.04206v4 [cs.CV] May 7, 2021.
Velickovic et al., "Graph Attention Networks," arXiv:1710.10903v3 [stat.ML] Feb. 4, 2018.
Wu et al., "A Comprehensive Survey on Graph Neural Networks," arXiv:1901.00596v4 [cs.LG] Dec. 4, 2019.
International Search Report and Written Opinion dated Jul. 21, 2021 for corresponding PCT/US2021/030580.

* cited by examiner

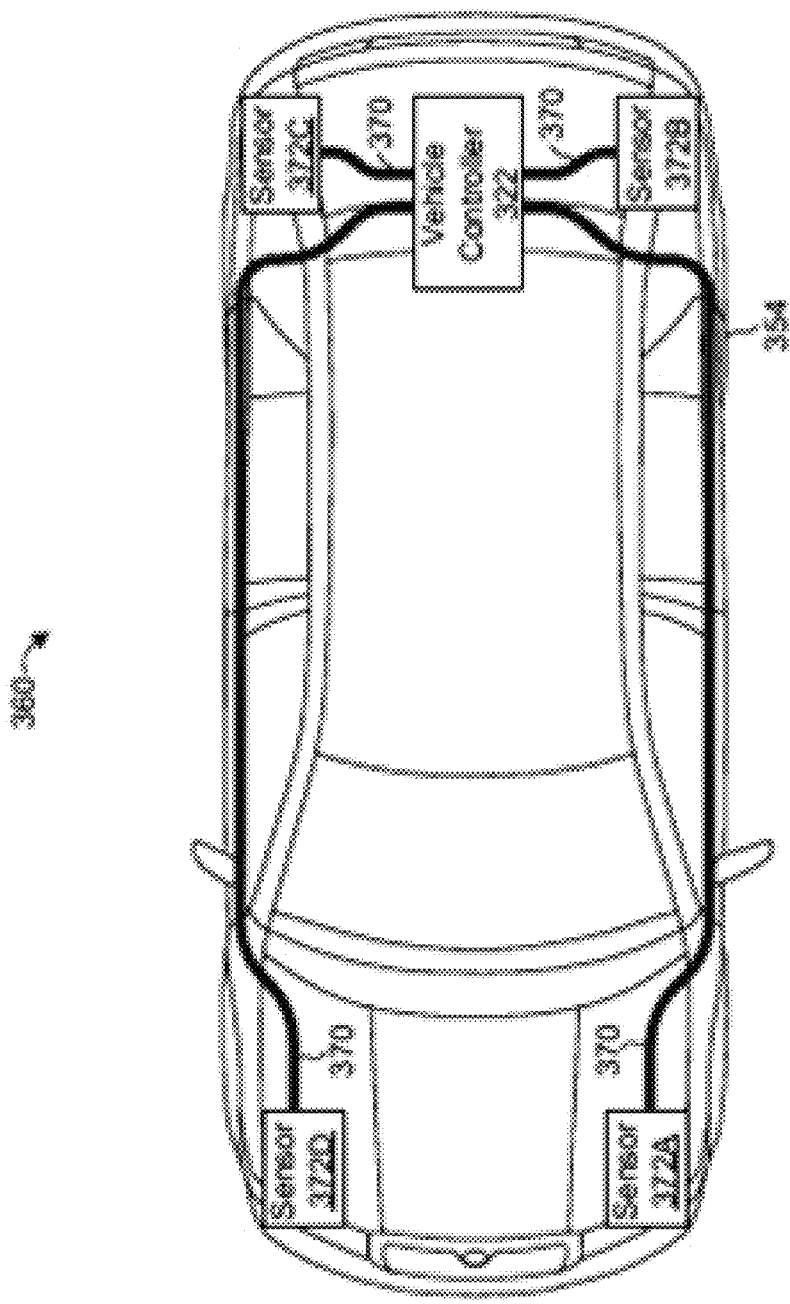

NEURAL NETWORK FOR OBJECT DETECTION AND TRACKING

CROSS-REFERENCE TO RELATED APPLICATION

The present application is a non-provisional application claiming priority to U.S. Provisional Patent Application No. 63/021,087, filed on May 6, 2020 and titled "Neural Network For Object Detection and Tracking," the disclosure of which is incorporated herein by reference in its entirety for all purposes.

FIELD OF TECHNOLOGY

This disclosure generally relates to multi-object tracking and, more particularly, to using a message passing graph to perform multi-object tracking in a sequence of images.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-driving or "autonomous" vehicles generally employ sensors, such as light detection and ranging (lidar) devices and/or conventional cameras, to detect or "see" the surrounding environment as the vehicles move toward their destinations. Such vehicles include control systems that process the sensor data and, based on both the sensed environment and the desired destination, determine which maneuvers and operational parameters (e.g., speed, braking force, steering direction) are most appropriate on a more or less continuous basis throughout the trip. The autonomous vehicles seek not only to arrive at the desired destination, but also to maintain the safety of both the autonomous vehicle passengers and any individuals who may be in the general vicinity of the autonomous vehicles.

The control architecture of an autonomous vehicle can implement perception functionality to identify various objects such as other vehicles, pedestrians, traffic signs and signals, lane and road boundaries, etc., as well as prediction functionality to determine the likely trajectories of objects relative to the autonomous vehicle. To efficiently implement perception and prediction, the control architecture must track multiple objects across different frames of lidar data or, more generally, across images collected by sensors at different times. However, efficient and accurate multi-tracking remains a difficult problem to solve.

SUMMARY

A system of this disclosure tracks multiple objects based on sensor data collected at different times, such as photographs or frames of lidar imagery. To this end, the system uses a message passing graph in which information can travel both in the forward and in the backward direction.

More specifically, in one embodiment, a method for multi-object tracking includes receiving, by processing hardware, a sequence of images generated at respective times by one or more sensors configured to sense an environment through which objects are moving relative to the one or more sensors. The method also includes constructing, by the processing hardware, a message passing graph in which each of a multiplicity of layers corresponds to a respective one in the sequence of images, the constructing including: generating, for each of the layers, a plurality of feature nodes to represent features detected in the corresponding image, and generating edges that interconnect at least some of the feature nodes across adjacent layers of the graph neural network to represent associations between the features. The method also includes tracking, by the processing hardware, multiple features through the sequence of images, including passing messages in a forward direction and a backward direction through the message passing graph to share information across time.

In another embodiment, a non-transitory computer-readable medium stores thereon instructions executable by one or more processors to implement a multi-object tracking architecture. The multi-object tracking architecture is configured to receive a sequence of images generated at respective times by one or more sensors configured to sense an environment through which objects are moving relative to the one or more sensors. The multi-object tracking architecture is also configured to construct a message passing graph in which each of a multiplicity of layers corresponds to a respective one in the sequence of image by: generating, for each of the layers, a plurality of feature nodes to represent features detected in the corresponding image, and generating edges that interconnect at least some of the feature nodes across adjacent layers of the graph neural network to represent associations between the features. The multi-object tracking architecture is configured to track multiple features through the sequence of images, including passing messages in a forward direction and a backward direction through the message passing graph to share information across time.

BRIEF DESCRIPTION OF THE DRAWINGS

FIG. 4B illustrates another example vehicle in which the techniques of this disclosure can be implemented;

DETAILED DESCRIPTION

Overview

Figure 1A:
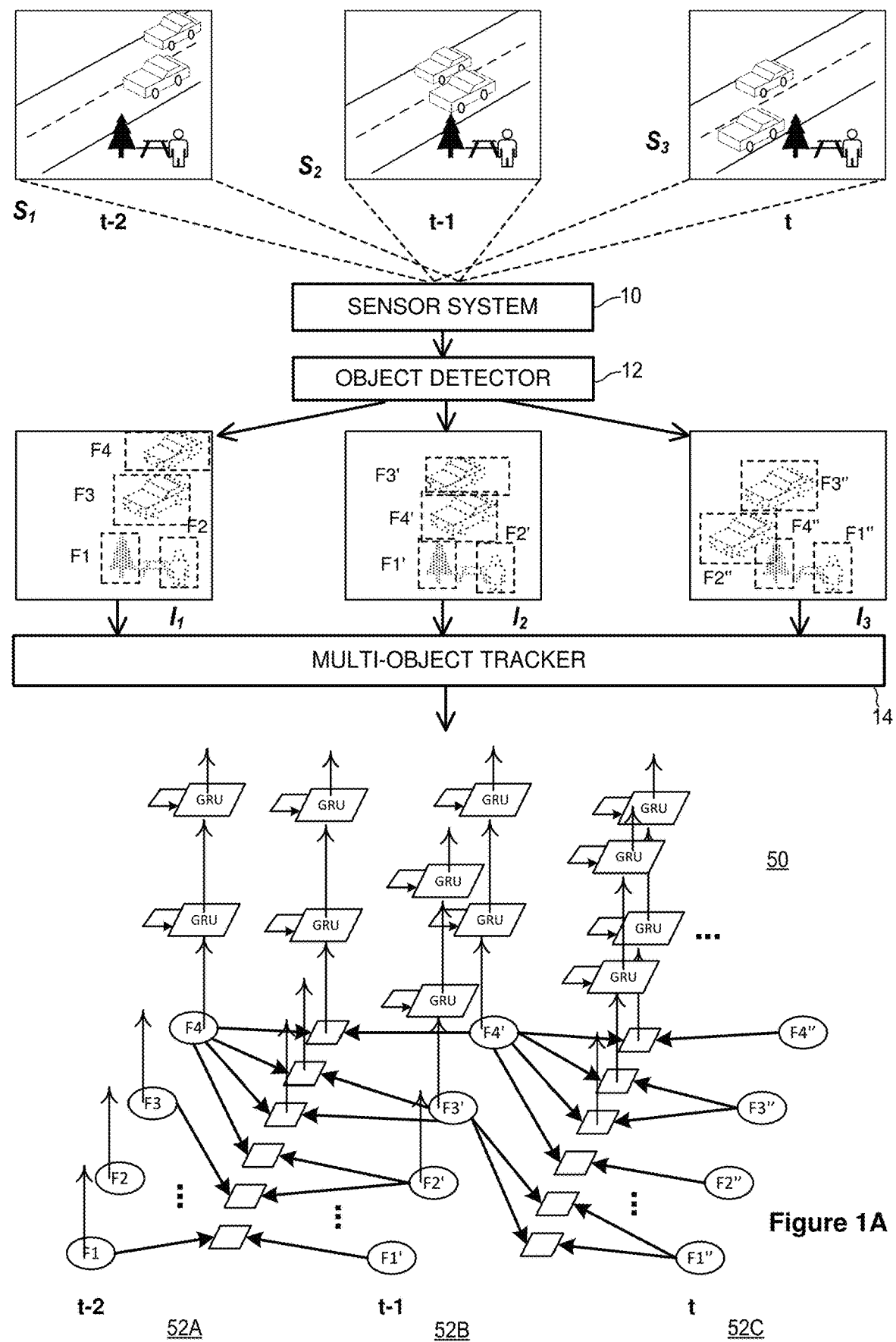
FIG. 1A schematically illustrates construction of an example message passing graph for multi-object tracking applied to a sequence of images, in accordance with the techniques of this disclosure.

Generally speaking, the techniques of this disclosure allow a system to efficiently track multiple objects across sensor data collected at different times. A lidar system can scan a field of regard with a certain periodicity to produce a sequence of images of the environment in the form of points cloud for example, and a computing system can implement these techniques to track objects observed in the sequence of images.

To this end, a multi-object tracker can construct a graph in which features of the objects define nodes. A feature can be a cluster of points of a certain size (e.g., N ls by M pixels) which the computing system generates through the process of segmentation for example. As another example, a feature can be a vector of values of reduced dimensions obtained from further processing of a point cloud. Features need not be of the same size and in general can correspond to any portion of an image. Because the graph also can include nodes associated with edges as discussed below, the nodes representing features are referred to as "feature nodes." The system associated features extracted from sensor data or image at a time t to define a layer L.

The multi-object tracker can interconnect the features disposed in different layers via edges to define hypotheses regarding possible tracks of features across the sequence of images. For example, the computer system can interconnect feature $F_1$ in layer $L_2$ with feature $F_1'$ in the adjacent, later-in-time layer $L_2$ as well with feature $F_2'$ in layer $L_2$, feature $F_3'$ in layer $L_2$, etc. After the system trains a neural network supported by the graph and generates inferences using the techniques of this disclosure, the system generate tracks for the various features, so as to ascertain for example that feature $F_1$ in layer $L_1$ is probably associated with feature $F_2'$ in layer $L_2$, which in turn is probably associated with feature $F_5'$ in layer $L_3$, etc.

Further, the system can generate edge nodes in addition to feature nodes. An edge node is associated with an edge and is connected to exactly one feature from one layer and exactly one feature from the adjacent layer. The graph thus includes layers of feature nodes interconnected via edges with edge nodes. The system then can implement message passing in accordance with graph neural networks message propagation techniques, so that the graph operates as a message passing graph (with two classes of nodes, feature nodes and edge nodes). More specifically, functions associated with feature nodes can operate on subsets of variables to compute messages (e.g., partial sums) and pass these messages to the edge nodes. Similarly, feature nodes can receive messages from edge nodes.

Still further, the system can associate feature nodes and edge nodes with respective neural network units configured to produce, for the feature nodes, the probabilities that the detection of the corresponding feature is correct; and for the edge nodes, the probabilities that the connection between the two features which the edge represents is correct (as discussed above, each edge node is connected to exactly two feature nodes: one from time t and the other from time t+1). These neural network units, placed at each feature and edge node, can be for example Long Short-Term Memory (LSTM) units. As is known in the art, an LSTM unit is made up of a cell to retain or "remember" values over a certain period of time, as well as an input gate, an output gate, and a forget gate to regulate the flow of information in and out of the cell. The system can chain LSTM or other suitable memory units to generate "vertical" stacks on top of the "horizontal" message passing graph. When an edge node receives messages from adjacent feature nodes, the edge node thus propagate the information through its corresponding vertical stack of LSTM units. Feature nodes receiving messages from edge nodes can operate in a similar manner.

During training and inference operations, the system passes messages through the message passing graph both in the forward (from an earlier-in-time layer to a later-in-time layer) and in the backward (from a later-in-time layer to an earlier-in-time layer) directions.

The system can limit the extent of message passing and account for new observations by advancing a rolling window through the message passing graph. For example, the size of the rolling window can be three, in which case the system operates on layers $L_i$, $L_{i+1}$, and $L_{i+2}$. Upon creating a new layer $L_j$ using new observations (and thus creating a new set of features in the layer $L_j$), the system advances the window to operate on layers $L_{i+1}$, $L_{i+2}$, and $L_{i+3}$. The system then can fix the layer neural network parameters of layer $L_i$, and exclude any further change in it as the rolling window no longer includes that layer. Because the system used the now-fixed layer $L_i$ in a previous iteration, the information from the layer $L_i$ has already propagated forward through the message passing graph.

In some implementations, the system trains both object detection and tracking using the techniques described above for constructing a message passing graph. To this end, the system can configure an object detector to output a feature vector for each detection and initiate the feature nodes using these vectors.

Example Message Passing Graph in a Multi-Object Tracking Scenario

Referring to FIG. 1A, a sensor system 10 can capture scenes $S_1$, $S_2$, $S_3$ of the environment 12 at times $t_1$, $t_2$, and $t_3$, respectively, and generate a sequence of images $I_1$, $I_2$, $I_3$, etc. The sensor system 10 can include any suitable combination of devices capable of sensing the environment, such as one or more lidar sensors (such as those illustrated in FIGS. 4A and 4B), one or more cameras, one or more radars, one or more thermal imaging devices, etc. Further, the sensor system 10 can be implemented as the sensors 102 of FIG. 3. In some implementations, the sensor system 10 generates the images $I_1$, $I_2$, $I_3$, etc. as point clouds in which each point has certain coordinates in a 3D space and, in some implementations, additional parameters such as intensity for example. In other implementations, the sensor system 10 generates the images $I_1$, $I_2$, $I_3$, etc. as two-dimensional images.

After the sensor system 10 generates the images $I_1$, $I_2$, $I_3$, etc., an object detector 12 can detect features $F_1$, $F_2$, $F_3$, and $F_4$ in image $I_1$, features $F'_1$, $F'_2$, $F'_3$, and $F'_4$ in image $I_2$, and features $F''_1$, $F''_2$, $F''_3$, and $F''_4$ in image $I_3$. For simplicity, FIG. 1A illustrates these features as encompassing entire objects such as cars, persons, or trees, but in general a feature can represent a portion of an object of any suitable size. Because feature $F_1$ may not necessarily correspond to feature $F_2$, a multi-object tracker 14 estimates the traces of the features $F_1$, $F_2$, $F_3$, and $F_4$ through the subsequent images $I_2$, $I_3$, etc. using a message passing graph 50. The object detector 12 and the multi-object tracker 14 can be implemented as components of a suitable self-driving software architecture, such as the example architecture 100 depicted in FIG. 3 (in particular, the object detector 12 and the multi-object tracker 14 can operate as components of the tracking module 114).

As illustrated in FIG. 1A, the message passing graph 50 generates layer 52A for the image $I_1$ generated at time $t_1$, layer 52B for the image $I_2$ generated at time $t_2$, and layer 52C for the image $I_3$ generated at time $t_3$. In general, the message passing graph 50 can include any suitable number of layers, each with any suitable number of features (however, as discussed below, the multi-object tracker 14 can apply a rolling window to the message passing graph 50 so as to limit the number of layers used at any one time). Each of the layers 52A-C includes feature nodes corresponding to the features the object detector 12 identified in the corresponding image (represented by oval shapes). The features nodes are interconnected via edges which, in this example implementation, also include edge nodes (represented by rectangular shapes). An edge node is connected to precisely two feature nodes: one in the earlier-in-time layer $L_N$ and another in the later-in-time layer $L_{N+1}$. Further, each of the feature nodes and the edge nodes includes a "stack" of GRUs, which can be implemented as LSTMs.

Generally speaking, memory units such as LSTMs and GRUs "learn" and "forget" information in order to make predictions. Particularly, the memory units learn and retain important information while discarding (e.g., "forgetting") unimportant information.

The neural network based the graph 50 (or graph 70 discussed below) grows in time as new detections are observed and new edge nodes are generated connecting the detections are added. The multi-object tracker 14 controls the growth of the neural network is controlled by the "rolling" or "sliding time" window (discussed with reference to FIG. 2A) that prunes older edge and feature nodes. The size of the window is a hyperparameter (e.g., a parameter whose value is set before a learning process begins). In some cases, the size of the sliding time window is between three and five time units.

In operation, the multi-object tracker 14 can propagate messages through the graph 50 so that the GRUs at the uppermost layer produce values indicative of the strongest (i.e., most probable) connection for example between feature $F_4$ of image $I_1$ and feature $F'_3$ of image $I_2$, and between feature $F'_3$ of image $I_2$ and feature $F''_3$ of image $I_3$. In other words, the multi-object tracker 14 trains a neural network based on the graph 50 so that the neural network produces an inference according to which features $F_4$, $F'_3$, and $F''_3$ probably represent the same physical object or a portion of the same physical object.

Figure 1B:
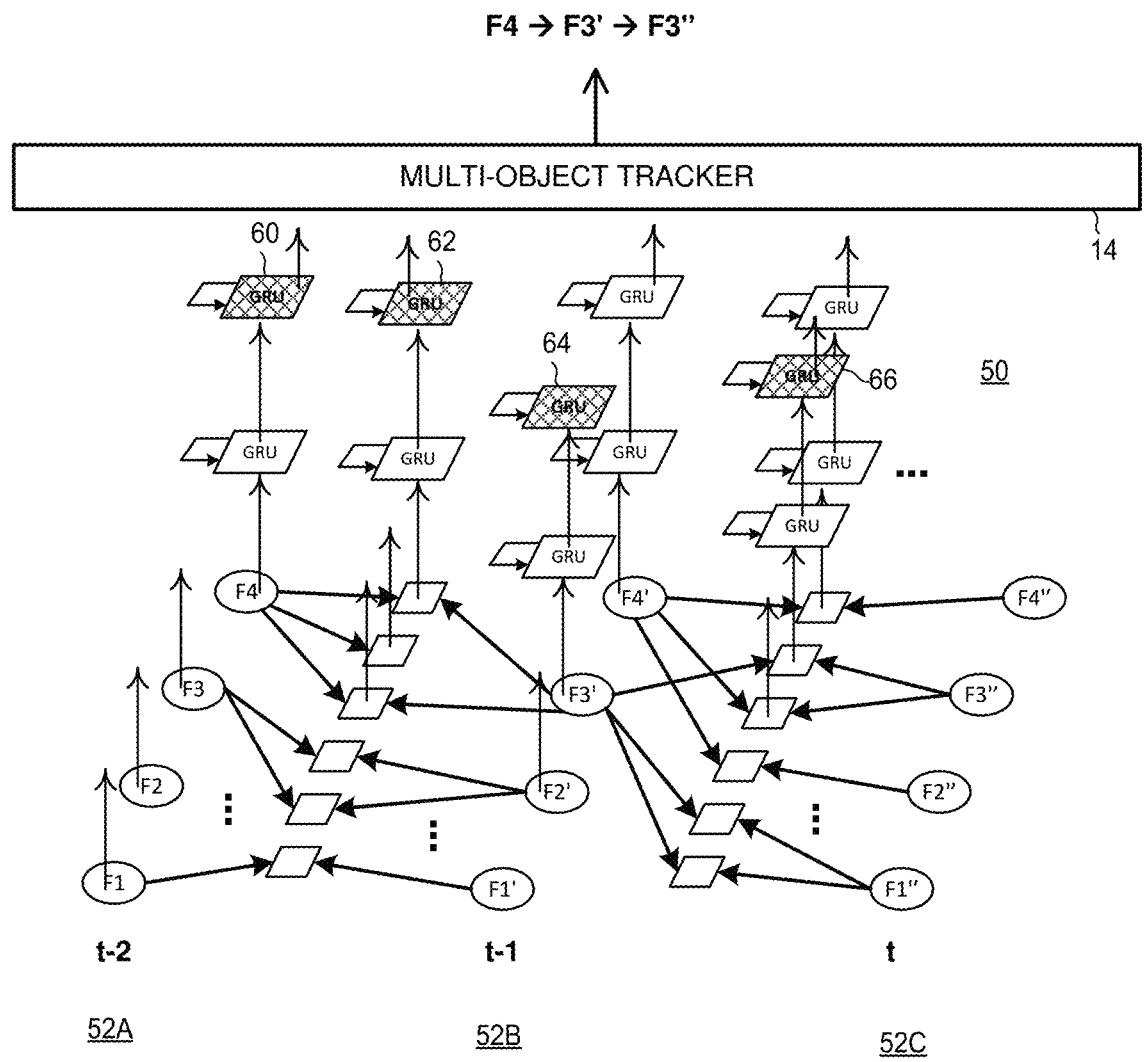
FIG. 1B schematically illustrates the output a multi-object tracker produces based on the message passing graph of FIG. 1A.

Referring to FIG. 1B, the multi-object tracker 14 can operate on the graph 50 to produce output according to which feature F4 of layer 52A likely corresponds to $F'_3$ of layer 52B and feature $F''_3$ of layer 52C. In particular, the multi-object tracker 14 propagates messages through the graph 50 in the forward and backward directions (corresponding to going forward and backward in time, respectively), which causes the functions at each node to update the corresponding values. The GRUs 60-66 in this example generate high values corresponding to high probabilities that feature F4 is the same feature as $F'_3$, which in turn is the same feature as $F''_3$. In a similar manner, and concurrently with the GRUs 60-66 generating the output schematically illustrated in FIG. 1B, the multi-object tracker 14 can establish other likely relationships between features in different layers, e.g., $F_1 \rightarrow F'_1 \rightarrow F''_4$.

Figure 2A:
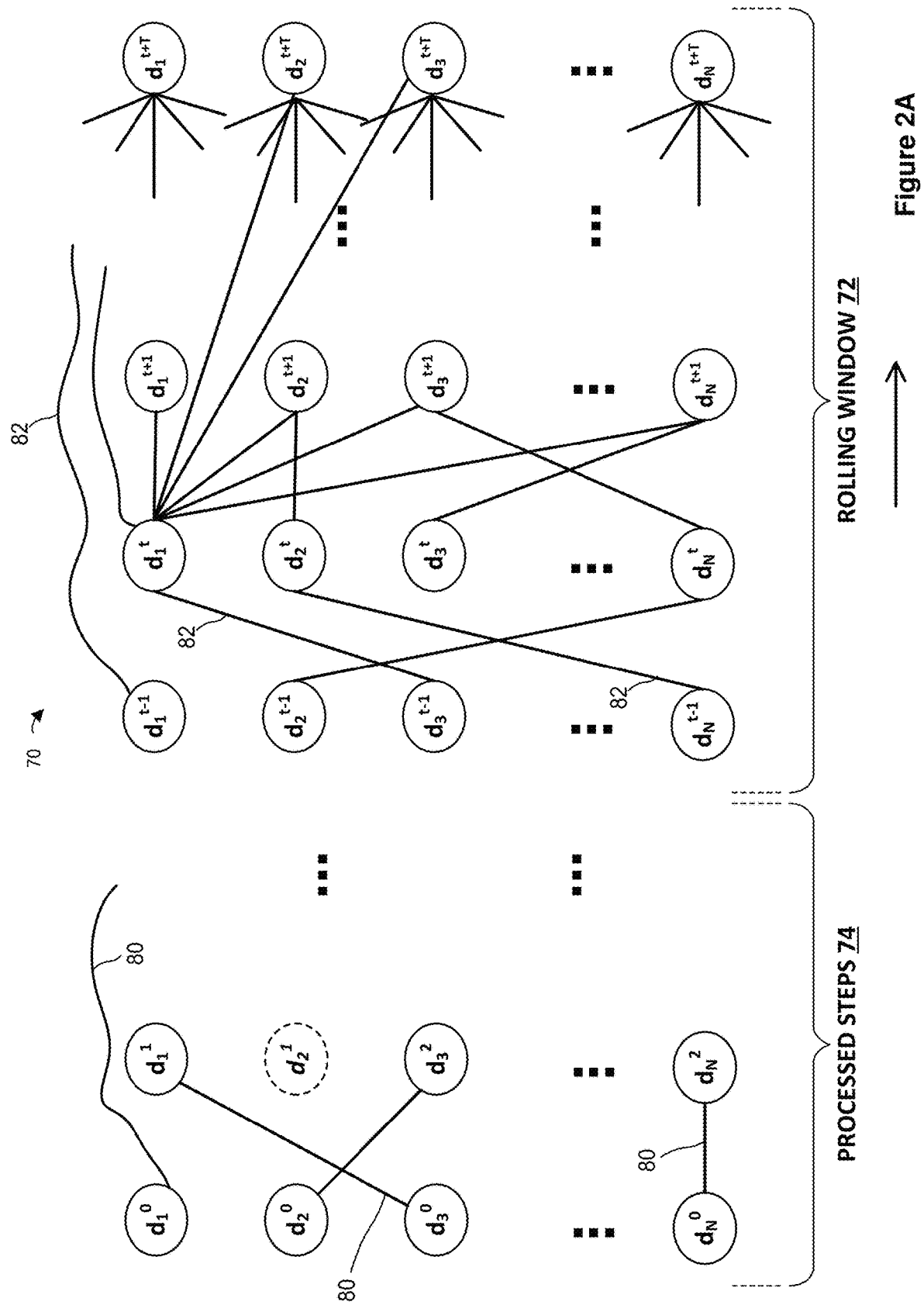
FIG. 2A illustrates application of a rolling window to a message passing graph.

As illustrated in FIG. 2A, the multi-object tracker 14 can apply a rolling window 70 to consider only M layers (e.g., three, four, five) of a graph 70 at a time. The rolling window 70 spans an interval of duration T, which can be any suitable fixed, configurable, or dynamic value (e.g., 10 ms, 50 ms, 200 ms, 500 ms). After the rolling window 70 advances past certain layers 72, the object tracker 14 can finalize certain edges (i.e., select as being likely correct) in these earlier-in-time layers 72, identify false positives (i.e., features that were likely identified incorrectly in a particular image and should not be connected to any features in the other layers). For simplicity, the graph 70 illustrates edges without the corresponding edge nodes.

In particular, feature nodes and $d_1^0$, $d_2^0$ and $d_3^0$ can be considered predicted true positive detection nodes connected to other predicted true positive detection nodes (e.g., $d_3^0$ to $d_1^1$) in later-in-time layers. The predicted true positive detection nodes are connected across layers in a pairwise manner via finalized edges 80, generated after data association. Thus, the multi-object tracker 14 determines where the same object is in the imagery collected at time t and in the imagery collected at time t+1.

On the other hand, feature $d_2^1$ can be considered a predicted false positive detection node because the multi-object tracker 14 could not link this node to another node in a later-in-time layer, and thus could not identify the feature in later-in-time imagery with the sufficient level of confidence.

Features $d_1^t$, $d_2^t$ . . . $d_N^{t+T}$ within the rolling window 72 can be considered active detection nodes, with at least some of the active detection nodes interconnected by active edges 82, generated with learned feature representation. Unlike the nodes in the earlier-in-time layers 74, the values (e.g., GRU outputs) of the nodes and edges continue to change while these nodes are within the rolling window 72. Accordingly, the active detection nodes $d_1^t$, $d_2^t$ . . . $d_N^{t+T}$ are interconnected by multiple active edges, until the multi-object tracker 14 can eliminate most and select the best connections as finalized edges. Further, it is noted that finalized edges 80 and detection edges 82 in some cases can interconnect nodes in non-adjacent layers, as illustrated in FIG. 2A. Thus, messages in some cases can "skip" one or more layers.

As discussed above, the multi-object tracker 14 some implementations use (at least) two classes of nodes: (i) edge notes, and (ii) feature nodes (which sometimes can be referred to as detection nodes). The feature nodes represent the detections, while the edge nodes represent the associations of the features. In some cases, and for the reasons discussed below, each edge node is connected to two and only two feature nodes: one backward in time and the other forward in time. In another case, a feature node is connected to all edge nodes.

A track is a sequence of edge-nodes connections that traces a unique path of associated features. The edge nodes and feature nodes can follow the message passing architecture (e.g., in a "horizontal" manner), which allows for neighborhood nodes to operate in a permutation-invariant fashion. The multi-object tracker 14 can allow for two different sets of permutation invariant operations: one for edges and one for nodes.

Returning to the examples of FIGS. 1A and 1B, in some embodiments, there is also a "vertical" dimension in addition to the "horizontal" dimension. In some of these embodiments, attached to each edge node or feature node, there is a "vertical" set of long short-term memory (LSTM) (or other type of memory unit such as gated recurrent units (GRUs), etc.) attached to fully connected layer that produces outputs: for feature nodes, the probability that detection with its features is a false positive or true positive; and, for edge nodes, a connectivity measure that represents whether the feature nodes attached to the particular edge node are connected or not. There is, therefore, a "horizontal" network of edge and feature nodes and a "vertical" set of memory units.

As indicated above, each layer of the graph 50 or 70 represents a timestep, i.e., corresponds to a different instance in time. The data association can be understood as a graph problem in which a connection between observations in time is an edge. The multi-object tracker 14 implements a neural network that learns from examples how to make these connections, and further learns from examples whether an observation is true (e.g., the connection between nodes $d_3^0$ and $d_1^1$) or false (e.g., resulting in the node $d_2^1$ not being connected to any other nodes at other times, and thus becoming a false positive feature node).

With continued reference to FIG. 2A, the multi-object tracker 14 operates on the multipartite graph 70 by moving the sliding window 72 (e.g., from left to right, as illustrated in FIG. 2A, in the direction from the past toward the future.). The multi-object tracker 14 can perform the training by implementing an algorithm illustrated by the following pseudo-code (Algorithm 1). In these examples, the acronym "MPNN" stands for Message Passing Neural Networks, discussed in more detail below.

The algorithms make use of the following high level functions, which are explained below:

initialize graph( ): This function creates an initial bipartite graph with detections from two consecutive timesteps, with fully connected edges between them.

update graph( ): This function is called after every timestep, to add new nodes (detections) and corresponding edges to the end of the currently active part of the graph (e.g., the part of the graph within a sliding time window, as discussed below), and fix parameters of and exclude further changes to the oldest set of nodes and edges from the currently active part of the graph, as the sliding time window no longer includes their layer. This essentially moves the sliding time window one step forward.

prune graph( ): This function removes low probability edges and nodes from the currently active part of the graph using a user specified threshold. This function can be called whenever memory/compute requirements exceed what is permissible (e.g., exceed a predetermined value(s) for either memory or processing resources).

decode graph( ): This function is called to decode the output probabilities for every node/edge into corresponding tracks. This can either be done in a greedy manner (e.g., by

| (Algorithm 1: one training pass through a sequence) |
| --- |
| net ← TrackMPNN( )                                      ▷ initialize TrackMPNN network |
| G ← initialize_graph( ) ▷ initialize graph with detections from first two timesteps |
| total_loss ← 0                                          ▷ initialize loss to 0 |
| (probabilities, loss) ← net. forward(G,labels)          ▷ forward pass |
| total_loss ← total_loss + loss                          ▷ add to total loss |
| for t ← 2 to $t_{end}$ do |
|    G ← update_graph(G,t) t ▷ add new detections and edges to graph; remove some others |
|    (probabilities, loss) ← net.forward(G,labels)    ▷ forward pass |
|    total_loss ← total_loss + loss                    ▷ add to total loss |
|    if condition then                                  Type equation here. |
|       G ← prune_graph(G,probabilities) |
|       ▷ remove low probability edges and nodes to limit memory footprint |
|    end if                                             ▷ |
| end for                                                  ▷ |
| net ← net.backward(total_loss)                           ▷ backward pass to train network |
| return net |

To perform inference, the multi-object tracker 14 can implement an algorithm illustrated by the following pseudo-code (Algorithm 2):

following the highest probability path from left to right) or by using the Hungarian algorithm (on consecutive timesteps from left to right).

| (Algorithm 2: inference on a sequence) |
| --- |
| tracks ← { }                                            ▷ initialize tracks to empty |
| net ← TrackMPNN(trained_weights) ▷ initialize TrackMPNN network with trained weights |
| G ← initialize_graph( ) ▷ initialize graph with detections from first two time steps |
| probabilities ← net(G)                                  ▷ forward pass to get probabilities |
| tracks ← tracks ∪ decode_graph(G,probabilities) |
|    ▷ decode network probabilities to produce tracks for desired window |
| for t ← 2 to $t_{end}$ do |
|    G ← update_graph(G,t) ▷ add new detections and edges to graph; remove someothers |
|    probabilities ← net(G)                             ▷ forward pass to get probabilities |
|    tracks ← tracks ∪ decode_graph(G,probabilities) |
|       ▷ decode network probabilities to produce tracks for desired window |
|    if condition then                                  Type equation here. |
|       G ← prune_graph(G,probabilities) |
|       ▷ remove low probability edges and nodes to limit memory footprint |
|    end if                                             ▷ |
| end for                                                  ▷ |
| return tracks |

TrackMPNN( ): This function initializes an instance of the proposed neural network model.

TrackMPNN.forward( ): This function carries out one forward pass of the data through the network.

TrackMPNN.backward( ): This function carries out one backward pass through the model to produce gradients with respect to the outputs.

Some of the advantages of this example approach the multi-object tracker 14 can be summarized as follows: (1) all detections are considered when associating detection pairs; (2) information is shared across time through message passing operations; (3) mistakes in the past can be corrected as multiple hypotheses are held; (4) there is no need for hand-crafted cost functions: rather, the network learns this from data by directly optimizing for task; (5) the approach is differentiable and hence end-to-end trainable; (6) it is possible to use gradients from the graph neural network (GNN) to supervise object detector to generate better features for association; and (7) it is possible to potentially merge tracker and predictor functionality by adding new output heads to the network.

An example model to which the multi-object tracker 14 can apply these functions are further the Example Model Architecture section below.

As indicated above, the multi-object tracker 14 in some cases can utilize a class of GNNs called Message Passing Neural Networks (MPNNs). An MPNNs can implement a message function that operates according to the example formula:

$$m_v^{t+1} = \sum_{w \in \mathcal{N}(v)} M_t(h_v^t, h_w^t, e_{vw}),$$ (Eq. 1)

a vertex update function that operates according to:

$$h_v^{t+1} = U_t(h_v^t, m_v^{t+1}), \text{ and}$$ (Eq. 2)

a readout/output function that operates according to:

$$\hat{y}_v^{t+1} = R(h_v^{t+1}),$$ (Eq. 3)

where a vertex in this context (e.g., a factor graph) can denote either a node (detection) or edge (association).

For present purposes, some embodiments use separate MPNN functions/weights for nodes and edges. As discussed above, nodes represent detection features, and are initialized with their corresponding feature vectors. Edges represent pairwise associations, and are initialized to zero vectors with the same length as detection features. One version of the network is three layers deep (one input, one hidden and one output layer respectively); however, this approach may be easily extended to multi-layer versions of the network. Each layer has its own message and vertex update functions, while the output layer also has a readout function. The functional form of the message and vertex update functions are the same for all layers, except for the dimensions of the output.

Figure 2B:
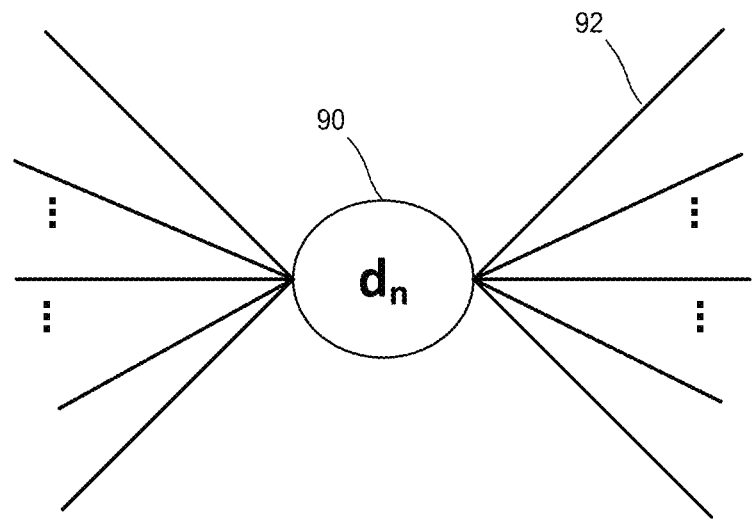
FIG. 2B illustrates an example node and adjacent edges, which can be used in the message passing graph of FIGS. 1A and 1B.

To illustrate node operation in more detail, an example node $d_n$ (label 90) and its adjacent edges 92 are depicted in FIG. 2B. Node 90 can be included in a message passing graph such as graph 50 or 70 discussed above. The multi-object detector 14 can implement several operations for node $d_n$, several of which are considered next.

The multi-object detector 14 can carry out the initialization of a node, to represent detection, according to the following formula:

$$h_n^0 = \text{relu}(W_{node}^f f_n + b_{node}^f)$$ (Eq. 4)

Thus, the hidden states of a node are initialized with a linear transformation (followed by a non-linearity) of its input feature representation $f_n$.

Further, the multi-object detector 14 can implement message and vertex update function for nodes (detections) according to the following formula:

$$h_n^t = \text{GRU}(h_n^{t-1}, \sum_{e \in \mathcal{N}(n)} W_{node}^h h_e^{t-1} + b_{node}^h)$$ (Eq. 5)

Thus, the hidden state of the node is updated based on its previous hidden state and the previous hidden states of its neighboring edges.

Still further, the multi-object detector 14 can implement a readout function for nodes (detections) according to the following formula:

$$o_n^t = \text{sigmoid}(W_{node}^o h_n^t + b_{node}^o)$$ (Eq. 6)

Here, the node output $o_n^t$ represents a scalar probability value. Every node output is associated with a binary cross-entropy loss. A node has a positive class if it is a true detection (see FIG. 2A and the corresponding discussion).

Figure 2C:
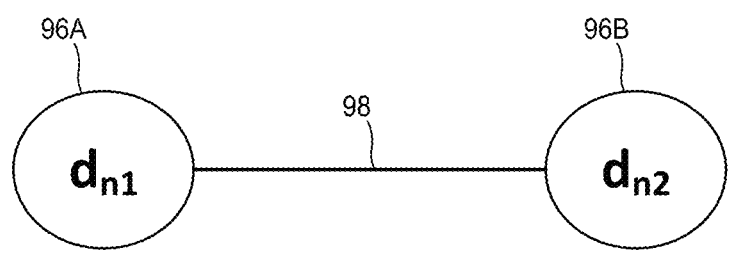
FIG. 2C illustrates an example of an edge and two neighboring nodes, which can be used in the message passing graph of FIGS. 1A and 1B.

Next, FIG. 2C illustrates edge operations for an example edge 98 interconnecting detection nodes 96A and 96B. The nodes 96A and 96B and the edge 98 can be implemented in the graph 50 or 70 discussed above, or any other suitable message passing graph. The multi-object detector 14 can implement can implement several edge operations include those discussed below.

First, the multi-object detector 14 can implement initialization of an edge representing an associations according to the following formula:

$$h_e^0 = 0$$ (Eq. 7)

Thus, the hidden states of edges are initialized with a vector of 0s.

The multi-object detector 14 can implement a message and vertex update function for edges representing associations according to the following formula:

$$h_e^t = \text{GRU}(h_e^{t-1}, W_{edge}^h(h_{n_1}^{t-1} \oplus h_{n_2}^{t-1}) + b_{edge}^h)$$ (Eq. 8)

The hidden state of the edge thus is updated based on its previous hidden state and the previous hidden states of its two neighboring nodes.

To implement a readout function for edges representing associations, the multi-object detector 14 can utilize the following formula:

$$o_e^t = \text{sigmoid}(W_{edge}^o h_e^t + b_{edge}^o)$$ (Eq. 9)

The node output $o_e^t$ represents a scalar probability value. Every edge output is associated with a binary cross-entropy loss. An edge has a positive class if it connects nodes belonging to the same track.

Using the framework discussed above, the multi-object tracker 14 can train the neural network based on the messaging graph 50 or 70 end-to-end. This approach can improve both the detecting and the tracking functionality due to joint optimization. More specifically, the multi-object tracker 14 can achieve this improvement by modifying the object detector to output a feature vector (to be learned) for each detection, which is used to initialize the hidden states of the nodes in the graph as depicted in the initialization of nodes equation mentioned above, $h_n^0 = \text{relu}(W_{node}^f f_n + b_{node}^f)$. This ensures gradient flow from tracker to detector during training, which can be used to learn better features for tracking.

An example perception system and an autonomous vehicle in which these techniques can be implemented is discussed next with reference to FIGS. 3-5B.

Example Architecture for Perception and Prediction in Autonomous Driving

Figure 3:
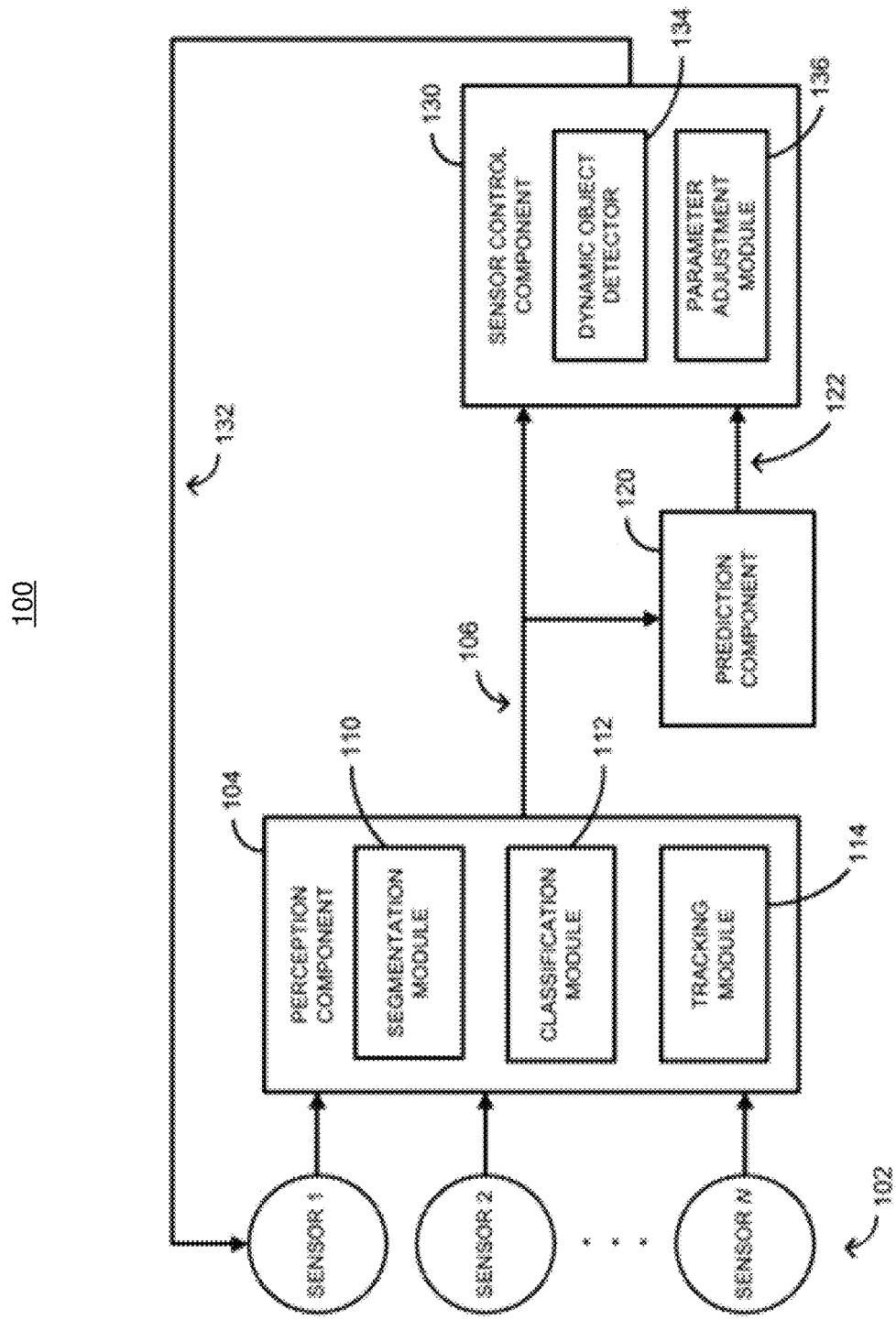
FIG. 3 is a block diagram of an example software architecture for an autonomous vehicle in which the techniques of this disclosure can be implemented.

FIG. 3 illustrates an example, software-based, sensor control architecture 100, which is used to dynamically control one or more parameters of one or more of sensors 102. The sensors 102 may be utilized by an autonomous vehicle (e.g., to make intelligent driving decisions based on the vehicle's current environment), or by a non-autonomous vehicle for other purposes (e.g., to collect data pertaining to a particular driving trip). As the term is used herein, an "autonomous" or "self-driving" vehicle is a vehicle configured to sense its environment and navigate or drive with no human input, with little human input, with optional human input, and/or with circumstance-specific human input. For example, an autonomous vehicle may be configured to drive to any suitable location and control or perform all safety-critical functions (e.g., driving, steering, braking, parking) for the entire trip, with the driver not being expected (or even able) to control the vehicle at any time. As another example, an autonomous vehicle may allow a driver to safely turn his or her attention away from driving tasks in particular environments (e.g., on freeways) and/or in particular driving modes.

An autonomous vehicle may be configured to drive with a human driver present in the vehicle, or configured to drive with no human driver present. As an example, an autonomous vehicle may include a driver's seat with associated controls (e.g., steering wheel, accelerator pedal, and brake pedal), and the vehicle may be configured to drive with no one seated in the driver's seat or with limited, conditional, or no input from a person seated in the driver's seat. As another example, an autonomous vehicle may not include any driver's seat or associated driver's controls, with the vehicle performing substantially all driving functions (e.g., driving, steering, braking, parking, and navigating) at all times without human input (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As the term is used herein, a "vehicle" may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

As seen in FIG. 3, the vehicle includes N different sensors 102, with N being any suitable integer (e.g., 1, 2, 3, 5, 10, 20, etc.). At least "Sensor 1" of the sensors 102 is configured to sense the environment of the autonomous vehicle by physically interacting with the environment in some way, such as transmitting and receiving lasers that reflect off of objects in the environment (e.g., if the sensor is a lidar device), transmitting and receiving acoustic signals that reflect off of objects in the environment (e.g., if the sensor is a radio detection and ranging (radar) device), simply receiving light waves generated or reflected from different areas of the environment (e.g., if the sensor is a camera), and so on. Depending on the embodiment, all of the sensors 102 may be configured to sense portions of the environment, or one or more of the sensors 102 may not physically interact with the external environment (e.g., if one of the sensors 102 is an inertial measurement unit (IMU)). The sensors 102 may all be of the same type, or may include a number of different sensor types (e.g., multiple lidar devices with different viewing perspectives, and/or a combination of lidar, camera, radar, and thermal imaging devices, etc.).

The data generated by the sensors 102 is input to a perception component 104 of the sensor control architecture 100, and is processed by the perception component 104 to generate perception signals 106 descriptive of a current state of the vehicle's environment. It is understood that the term "current" may actually refer to a very short time prior to the generation of any given perception signals 106, e.g., due to the short processing delay introduced by the perception component 104 and other factors. To generate the perception signals 106, the perception component 104 may include a segmentation module 110, a classification module 112 and a tracking module 114.

The segmentation module 110 is generally configured to identify distinct objects within the environment, as represented by the sensor data (or a portion of the sensor data). Depending on the embodiment and/or scenario, the segmentation task may be performed separately for each of a number of different types of sensor data (e.g., the segmentation module 110 may include a number of modules operating in parallel), or may be performed jointly on a fusion of multiple types of sensor data. In some embodiments where lidar devices are used, the segmentation module 110 analyzes point cloud frames to identify subsets of points within each frame that correspond to probable physical objects in the environment. In other embodiments, the segmentation module 110 jointly analyzes lidar point cloud frames in conjunction with camera (and/or other) image frames to identify objects in the environment. Examples of lidar devices/systems and point clouds are discussed in further detail below. Other suitable techniques, and/or data from other suitable sensor types, may also be used to identify objects. As used herein, references to different or distinct "objects" may encompass physical things that are entirely disconnected (e.g., with two vehicles being two different "objects"), as well as physical things that are connected or partially connected (e.g., with a vehicle being a first "object" and the vehicle's hitched trailer being a second "object").

The segmentation module 110 may use predetermined rules or algorithms to identify objects. For example, the segmentation module 110 may identify as distinct objects, within a point cloud, any clusters of points that meet certain criteria (e.g., having no more than a certain maximum distance between all points in the cluster, etc.). Alternatively, the segmentation module 110 may utilize a neural network that has been trained to identify distinct objects within the environment (e.g., using supervised learning with manually generated labels for different objects within test data point clouds, etc.), or another suitable type of machine learning based model. Example operation of the segmentation module 110 is discussed in more detail below in FIG. 5B, for an embodiment in which the perception component 104 processes point cloud data.

The classification module 112 is generally configured to determine classes (labels, categories, etc.) for different objects that have been identified by the segmentation module 110. Like the segmentation module 110, the classification module 112 may perform classification separately for different sets of the sensor data (e.g., the classification module 112 may include a number of modules operating in parallel), or may classify objects based on a fusion of data from multiple sensors, etc. Moreover, and also similar to the segmentation module 110, the classification module 112 may execute predetermined rules or algorithms to classify objects, use a neural network that has been trained to classify identified objects within the environment (e.g., using supervised learning with manually generated labels for different point cloud representations of distinct objects, etc.), or use another suitable machine learning based model to classify objects. Example operation of the classification module 112 is discussed in more detail below in FIG. 5B, for an embodiment in which the perception component 104 processes point cloud data.

The tracking module 114 is generally configured to track distinct objects over time (e.g., across multiple lidar point cloud or camera image frames). The tracked objects are generally objects that have been identified by the segmentation module 110, but may or may not be objects that were classified by the classification module 112, depending on the embodiment and/or scenario. The segmentation module 110 may assign identifiers to identified objects, and the tracking module 114 may associate existing identifiers with specific objects where appropriate (e.g., for lidar data, by associating the same identifier with different clusters of points, at different locations, in successive point cloud frames). Like the segmentation module 110 and the classification module 112, the tracking module 114 may perform separate object tracking based on different sets of the sensor data (e.g., the tracking module 114 may include a number of modules operating in parallel), or may track objects based on a fusion of data from multiple sensors. Moreover, and also similar to the segmentation module 110 and the classification module 112, the tracking module 114 may execute predetermined rules or algorithms to track objects, may use a neural network that has been trained to track identified (and possibly classified) objects within the environment (e.g., using supervised learning with manually generated labels for different pairs or sets of point cloud frames, etc.), or another suitable machine learning model to track objects.

Because the blocks of FIG. 3 (and various other figures described herein) depict a software architecture rather than physical components, it is understood that, when any reference is made herein to a particular neural network or other software architecture component being "trained," or to the role of any software architecture component (e.g., sensors 102) in conducting such training, the operations or procedures described may have occurred on a different computing system (e.g., using specialized development software). Thus, for example, neural networks of the segmentation module 110, classification module 112 and/or tracking module 114 may have been trained on a different computer system before being implemented within any vehicle. Put differently, the components of the sensor control architecture 100 may be included in a "final" product within a particular vehicle, without that vehicle or its physical components (sensors 102, etc.) necessarily having been used for any training processes.

The sensor control architecture 100 also includes a prediction component 120, which processes the perception signals 106 to generate prediction signals 122 descriptive of one or more predicted future states of the vehicle's environment. For a given object, for example, the prediction component 120 may analyze the type/class of the object (as determined by the classification module 112) along with the recent tracked movement of the object (as determined by the tracking module 114) to predict one or more future positions of the object. As a relatively simple example, the prediction component 120 may assume that any moving objects will continue to travel with no change to their current direction and speed, possibly taking into account first- or higher-order derivatives to better track objects that have continuously changing directions, objects that are accelerating, and so on. In some embodiments, the prediction component 120 also predicts movement of objects based on more complex behaviors. For example, the prediction component 120 may assume that an object that has been classified as another vehicle will follow rules of the road (e.g., stop when approaching a red light), and will react in a certain way to other dynamic objects (e.g., attempt to maintain some safe distance from other vehicles). The prediction component 120 may inherently account for such behaviors by utilizing a neural network or other suitable machine learning model, for example. In some embodiments, the prediction component 120 may be omitted from the sensor control architecture 100 (e.g., if the vehicle does not perform any prediction of future environment states, or if the vehicle does perform prediction but predicted environment states are not used to control any sensors).

In some embodiments, the perception signals 106 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 114, possibly with an "unknown" class for certain pixels that were not successfully classified. Similarly, the prediction signals 122 may include, for each such grid generated by the perception component 104, one or more "future occupancy grids" that indicate predicted object positions, boundaries and/or orientations at one or more future times (e.g., 1, 2 and 5 seconds ahead). In other embodiments, the sensor control architecture 100 does not generate or utilize occupancy grids.

The perception signals 106 and (in some embodiments) prediction signals 122 are input to a sensor control component 130, which processes the signals 106, 122 to generate sensor control signals 132 that control one or more parameters of at least one of the sensors 102 (including at least a parameter of "Sensor 1"). In particular, the sensor control component 130 attempts to direct the focus of one or more of the sensors 102 based on the presence, positions, and/or types of "dynamic" objects within the vehicle's environment. To this end, the sensor control component 130 includes a dynamic object detector 134 in communication with a parameter adjustment module 136. The dynamic object detector 134 may detect the presence of dynamic objects based on the classification of those objects by the classification module 112. For example, the dynamic object detector 134 may access a locally-stored list of classes that correspond to dynamic objects (e.g., "vehicle," "cyclist," "pedestrian," "deer," etc.), and may flag a particular object as "dynamic" if the classification module 112 labeled that object according to one of the dynamic object classes.

Alternatively, or in addition, the dynamic object detector 134 may detect the presence of dynamic objects based on observed behaviors of the objects. For example, the dynamic object detector 134 may access a locally-stored set of rules or algorithms that determine whether an object being tracked by the tracking module 114 is to be flagged as a "dynamic" object. As a more specific example, the dynamic object detector 134 may flag an object as "dynamic" if data from the tracking module 114 (within the perception signals 106) indicates that the object has moved in any direction (or in any lateral direction, etc.) faster than a threshold speed (e.g., 0.25 meters per second, 0.5 meters per second, etc.). In some embodiments, the dynamic object detector 134 includes a neural network that is trained (e.g., using manually labeled training datasets) to identify dynamic objects based on the perception signals 106 and/or the prediction signals 122.

In still other embodiments, the dynamic object detector 134 detects the presence of dynamic objects based on sensor data from one or more of the sensors 102, prior to processing of the sensor data by the perception component 104 (e.g., based on raw sensor data from one or more of the sensors 102). For example, the dynamic object detector 134 may apply one or more rules or algorithms, or use a machine learning model, to directly identify dynamic objects within point cloud frames from one of the sensors 102. In effect, in some embodiments, this may be viewed as the dynamic object detector 134 implementing a more simplistic version of the functionality of segmentation module 110, classification module 112, and/or tracking module 114, separate from the operations of the perception component 104. For example, the dynamic object detector 134 may use simple heuristics to identify a "clump" or "cluster" of points that is likely to correspond, roughly, to a single object (e.g., where you have greater than a threshold number of points all within a threshold distance of each other when the points are represented in three-dimensional space), and to determine that the clump or cluster is moving over time (e.g., by calculating the movement of centroids of different clumps or clusters across multiple frames, and assuming that the centroids of clusters in adjacent frames belong to the same object if certain criteria are met). Thus, as used herein (unless the context clearly denotes a different meaning), references to the identification or detection of a "dynamic object" do not necessarily mean that the perception component 104 has already identified, classified, or tracked the object.

The parameter adjustment module 136 determines the setting for parameter(s) of the controlled sensor(s) (among sensors 102) based on the dynamic objects detected by the dynamic object detector 134. In particular, the parameter adjustment module 136 determines values of one or more parameters that set the area of focus of the controlled sensor(s). Generally, the controlled parameter(s) is/are parameters that affect which area/portion of the vehicle environment is sensed by a particular sensor. For example, the parameter adjustment module 136 may determine values that set the horizontal and/or vertical field of regard of the controlled sensor(s) (e.g., the range of azimuthal and/or elevation angles covered by the field of regard), the center of the field of regard (e.g., by mechanically moving the entire sensor, or adjusting mirrors that move the center of the field of regard), and/or the spatial distribution of scan lines produced by the sensor(s). In some embodiments, the controlled sensor parameter(s) affect not only the area of focus for a sensor, but also the manner in which a given area of the vehicle environment is sensed. For example, the parameter adjustment module 136 may control the frame/refresh rate of the sensor, the resolution (e.g., number of points per point cloud frame) of the sensor, and so on.

The parameter adjustment module 136 may determine a desired area of focus for a controlled sensor based on current positions of one or more dynamic objects (e.g., using the perception signals 106), and/or based on predicted/expected positions of the dynamic object(s) (e.g., using the prediction signals 122). For example, the parameter adjustment module 136 may set lidar device parameters such that the field of regard of the lidar device is centered on the current position of a dynamic object, and possibly also "zoomed in" on that object (e.g., by reducing the horizontal and vertical field of regard without necessarily reducing the number of points in each point cloud frame). Alternatively, the parameter adjustment module 136 may set lidar device parameters such that the field of regard of the lidar device is centered on an expected/predicted position of the dynamic object at a time in the near future (e.g., 0.5 seconds in the future, 1 second in the future, etc.).

The parameter adjustment module 136 may determine the desired area of focus based on a single dynamic object, based on the class of a dynamic object, and/or based on an area of high density of multiple dynamic objects or dynamic object classes. For example, the parameter adjustment module 136 may identify an area of focus as being an area that contains a pedestrian or vehicle, an area that includes at least two pedestrians or vehicles, an area that includes a highest density of any sort of dynamic object (as compared to the rest of the sensed environment), etc. The parameter adjustment module 136 may also set the area of focus (e.g., the horizontal and/or vertical field of regard) such that detected dynamic objects are entirely included within that area (e.g., without excluding or "cutting off" a portion of a detected vehicle, or a portion of a detected pedestrian's body, etc.).

As noted above, in some embodiments, a sensor's area of focus is set by changing a spatial distribution of scan lines for the sensor, instead of (or in addition to) changing the center or size of the sensor's field of regard. For example, a lidar or radar device may focus on a specific range of elevation angles within the field of regard—without necessarily changing the size of the field of regard—by increasing the density of scan lines covering that range of elevation angles relative to the density of scan lines that cover other elevation angles within the field of regard.

The dynamic object detector 134 may detect the presence of dynamic objects using sensor data that was generated based on data from the sensor(s) that is/are being controlled, and/or using sensor data that was generated based on data from one or more other sensors of the sensors 102. If the sensor control component 130 only controls "Sensor 1," for example, the dynamic object detector 134 may identify dynamic objects using perception signals 106 generated based only on data from "Sensor 1," using perception signals 106 based only on data from any one or more of "Sensor 2" through "Sensor N," or using perception signals 106 based on both data from "Sensor 1" and data from any one or more of "Sensor 2" through "Sensor N." Thus, for example, a camera with a wide-angle view of the environment may be used to determine a narrower area of focus for a lidar device, or a lidar device may initially be set to have a relatively large field of regard, and later be set to focus on (e.g., center a smaller field of regard upon) a dynamic object detected in a specific portion of the larger field of regard, etc.

Example Vehicle with a Lidar System

Figure 4A:
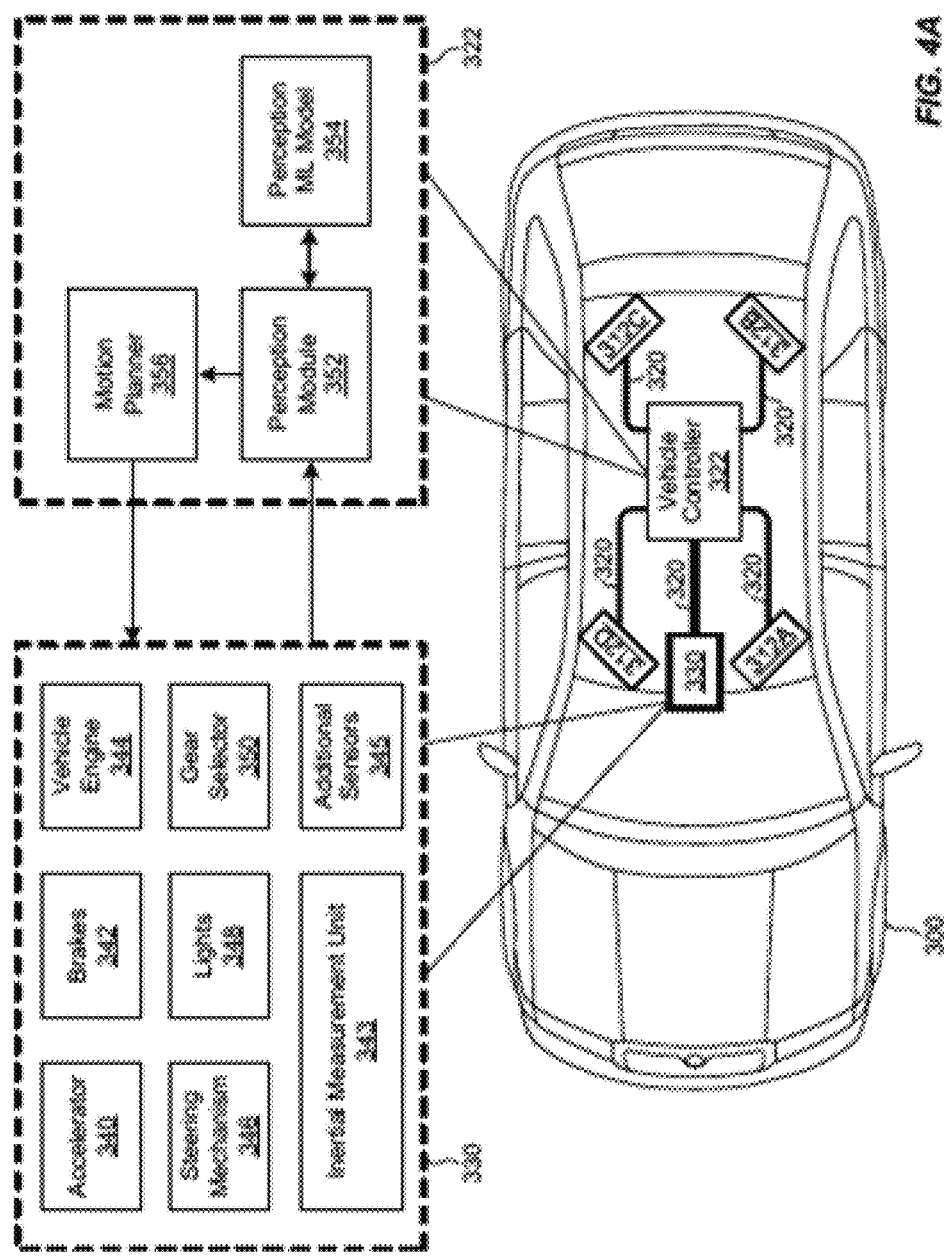
FIG. 4A illustrates an example autonomous vehicle in which the techniques of this disclosure can be implemented.

FIG. 4A illustrates an example vehicle 300 with a lidar system 302. The lidar system 302 includes multiple sensor heads 312A-312D, each of which is equipped with a respective laser. Alternatively, the sensor heads 312A-D can be coupled to a single laser via suitable laser-sensor links. In general, each of the laser-sensor links 314 may include one or more optical links and/or one or more electrical links.

The sensor heads 312 in FIG. 4A are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 312 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 4A, four sensor heads 312 are positioned at or near the four corners of the vehicle (e.g., each of the sensor heads 312 may be incorporated into a light assembly, side panel, bumper, or fender), and the laser 310 may be located within the vehicle 300 (e.g., in or near the trunk). The four sensor heads 312 may each provide a 90° to 120° horizontal field of regard (FOR), and the four sensor heads 312 may be oriented so that together they provide a complete 360-degree view around the vehicle. As another example, the lidar system 302 may include six sensor heads 312 positioned on or around the vehicle 300, where each of the sensor heads 312 provides a 60° to 90° horizontal FOR. As another example, the lidar system 302 may include eight sensor heads 312, and each of the sensor heads 312 may provide a 45° to 60° horizontal FOR. As yet another example, the lidar system 302 may include six sensor heads 312, where each of the sensor heads 312 provides a 70° horizontal FOR with an overlap between adjacent FORs of approximately 10°. As another example, the lidar system 302 may include two sensor heads 312 which together provide a forward-facing horizontal FOR of greater than or equal to 30°.

Data from each of the sensor heads 312 may be combined or stitched together to generate a point cloud that covers a greater than or equal to 30-degree horizontal view around a vehicle. For example, the laser 310 may include a controller or processor that receives data from each of the sensor heads 312 (e.g., via a corresponding electrical link 320) and processes the received data to construct a point cloud covering a 360-degree horizontal view around a vehicle or to determine distances to one or more targets. The point cloud or information from the point cloud may be provided to a vehicle controller 322 via a corresponding electrical, optical, or radio link 320. The vehicle controller 322 may include one or more CPUs, GPUs, and a non-transitory memory with persistent components (e.g., flash memory, an optical disk) and/or non-persistent components (e.g., RAM).

In some implementations, the point cloud is generated by combining data from each of the multiple sensor heads 312 at a controller included within the laser 310, and is provided to the vehicle controller 322. In other implementations, each of the sensor heads 312 includes a controller or processor that constructs a point cloud for a portion of the 360-degree horizontal view around the vehicle and provides the respective point cloud to the vehicle controller 322. The vehicle controller 322 then combines or stitches together the points clouds from the respective sensor heads 312 to construct a combined point cloud covering a 360-degree horizontal view. Still further, the vehicle controller 322 in some implementations communicates with a remote server to process point cloud data.

In any event, the vehicle 300 may be an autonomous vehicle where the vehicle controller 322 provides control signals to various components 330 within the vehicle 300 to maneuver and otherwise control operation of the vehicle 350. The components 330 are depicted in an expanded view in FIG. 4A for ease of illustration only. The components 330 may include an accelerator 340, brakes 342, a vehicle engine 344, a steering mechanism 346, lights 348 such as brake lights, head lights, reverse lights, emergency lights, etc., a gear selector 350, an IMU 343, additional sensors 345 (e.g., cameras, radars, acoustic sensors, atmospheric pressure sensors, moisture sensors, ambient light sensors, as indicated below) and/or other suitable components that effectuate and control movement of the vehicle 300. The gear selector 350 may include the park, reverse, neutral, drive gears, etc. Each of the components 330 may include an interface via which the component receives commands from the vehicle controller 322 such as "increase speed," "decrease speed," "turn left 5 degrees," "activate left turn signal," etc. and, in some cases, provides feedback to the vehicle controller 322.

The vehicle controller 322 can include a perception module 352 that receives input from the components 300 and uses a perception machine learning (ML) model 354 to provide indications of detected objects, road markings, etc. to a motion planner 356, which generates commands for the components 330 to maneuver the vehicle 300. Referring back to FIG. 1, the components 352-356 in one embodiment implement the components 102-107, in any suitable configuration.

In some implementations, the vehicle controller 322 receives point cloud data from the sensor heads 312 via the link 320 and analyzes the received point cloud data, using any one or more of the techniques described herein. The vehicle controller 322 then provides control signals via another link 320 to the components 330 to control operation of the vehicle based on the analyzed information.

In addition to the lidar system 302, the vehicle 300 may also be equipped with other sensors 345 such as a camera, a thermal imager, a conventional radar (none illustrated to avoid clutter), etc. The sensors can provide additional data to the vehicle controller 322 via wired or wireless communication links. Further, the vehicle 300 in an example implementation includes a microphone array operating as a part of an acoustic source localization system configured to determine sources of sounds.

As another example, FIG. 4B illustrates a vehicle 360 in which several heads 372, each of which may be similar to one of the sensor heads 312 of FIG. 4A and on the trunk. In particular, the sensor heads 372B and C are oriented to face backward relative to the orientation of the vehicle 360, and the sensor heads 372A and D are oriented to face forward relative to the orientation of the vehicle 360. In another implementation, additional sensors are disposed at the side view mirrors, for example.

Figure 5A:
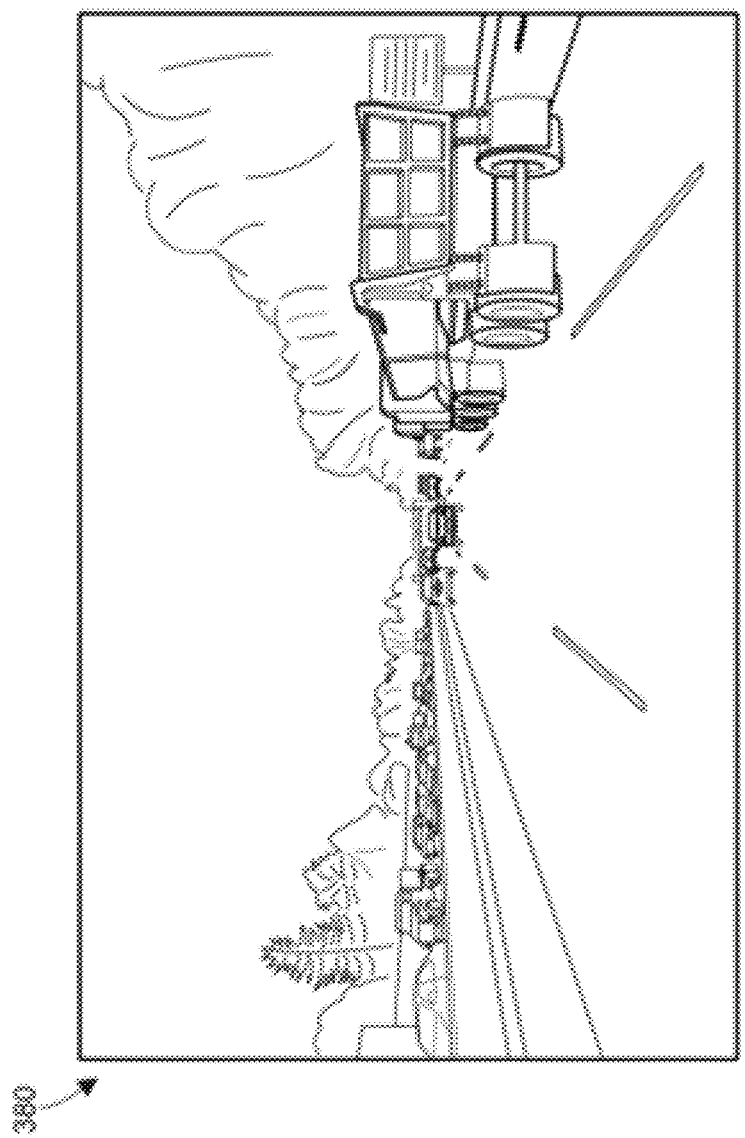
FIG. 5A illustrates an example environment in the direction of travel of an autonomous vehicle.
Figure 5B:
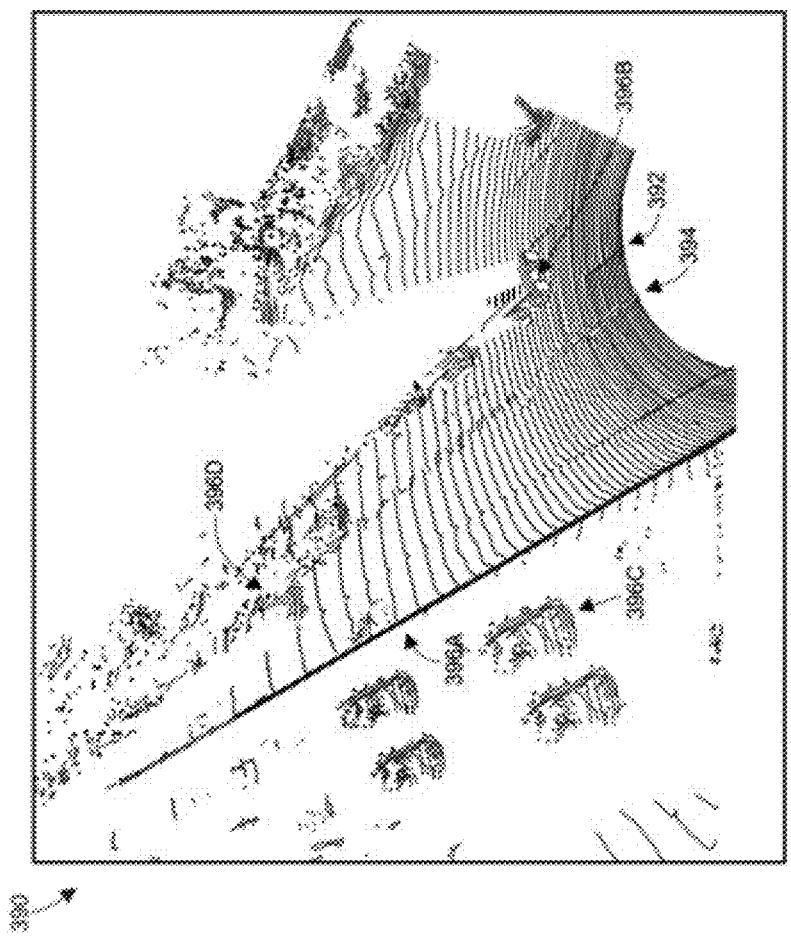
FIG. 5B illustrates an example point cloud a sensor system operating in an autonomous vehicle may generate for the environment of FIG. 5A.

FIG. 5A depicts an example real-world driving environment 380, and FIG. 5B depicts an example point cloud 390 that is generated by a lidar system scanning the environment 380 (e.g., the lidar system 200 of FIGS. 2 and 3 or the lidar system 302 of FIG. 4A). As seen in FIG. 5A, the environment 380 includes a highway with a median wall that divides the two directions of traffic, with multiple lanes in each direction. The point cloud 390 of FIG. 5B corresponds to an example embodiment in which two lidar devices each capture a roughly 60 degree horizontal field of regard, and in which the two fields of regard have a small overlap 392 (e.g., two or three degrees of overlap). The point cloud 390 may have been generated using the sensor heads 312A and 312D of FIG. 4A, or the sensor heads 372A and 372G of FIG. 4B, for example. While depicted as a visual image in FIG. 5B, it is understood that, in some embodiments, the point cloud 390 is not actually rendered or displayed at any time.

As seen in FIG. 5B, the point cloud 390 depicts a ground plane 394 (here, the road surface) as a number of substantially continuous scan lines, and also depicts, above the ground plane 394, a number of objects 396. For clarity, only a small number of the objects shown in FIG. 5B are labeled with a reference number. Referring back to FIG. 3, distinct ones of the objects 396 within the point cloud 390 may be identified by the segmentation module 110. For example, the segmentation module 110 may detect substantial gaps and/or other discontinuities in the scan lines of the ground plane 394, and identify groups of points in the vicinity of those discontinuities as discrete objects. The segmentation module 110 may determine which points belong to the same object using any suitable rules, algorithms or models. Once the objects 396 are identified, the classification module 112 of FIG. 3 may attempt to classify the objects, and the tracking module 114 of FIG. 3 may attempt to track the classified objects (and, in some embodiments/scenarios, unclassified objects) across future point clouds similar to point cloud 390 (i.e., across multiple point cloud frames).

For various reasons, it may be more difficult for the segmentation module 110 to identify certain objects 396, and/or for the classification module 112 to classify certain objects 396, within the point cloud 390. As can be seen in FIG. 5B, for example, a median wall 396A may be relativity easy to identify and classify due to the high density of points as well as the "shadow" (i.e., absence or relative scarcity of points) that the wall 396A creates. A truck 396B may also be relatively easy to identify as an object, due to the high density of points (and possibly the shape of its shadow), but may not be as easy to classify due to the fact that large portions of the truck 396B are hidden within the lidar shadow. The vehicle 396C may be relatively easy to identify as an object, but may be more difficult to classify due to the lack of points within the lidar shadow created by the median wall 396A (i.e., along the lower portions of the vehicle 396C). The vehicle 396D may be more difficult to identify as a distinct object due to the scarcity of points at the greater distance from the autonomous vehicle, as well as the close proximity between the points corresponding to the vehicle 396D and points of other, nearby objects. Still other objects may be difficult to identify, classify and/or track due to their small size and/or low profile. For example, while not shown in FIG. 5B, the segmentation module 110 may identify (and the classification module 112 may classify) lane markings within the point cloud 390. The lane markings may appear as small but abrupt deviations in the path of the scan lines, for example, with those deviations collectively forming a line pattern that aligns with the direction of travel of the vehicle (e.g., approximately normal to the curve of the scan lines).

Despite such difficulties, the segmentation module 110, classification module 112 and/or tracking module 114 may use techniques that make object identification, classification and/or tracking highly accurate across a very wide range of scenarios, with scarce or otherwise suboptimal point cloud representations of objects. For example, the segmentation module 110, classification module 112 and/or tracking module 114 may include neural networks that were trained using data (e.g., manually labeled scenes) corresponding to a very large number of diverse environments/scenarios (e.g., with various types of objects at different distances, in different orientations, with different degrees of concealment, in different weather and/or lighting conditions, and so on).

Example Methods of Multi-Object Tracking Using Message Passing Graphs

Figure 6:
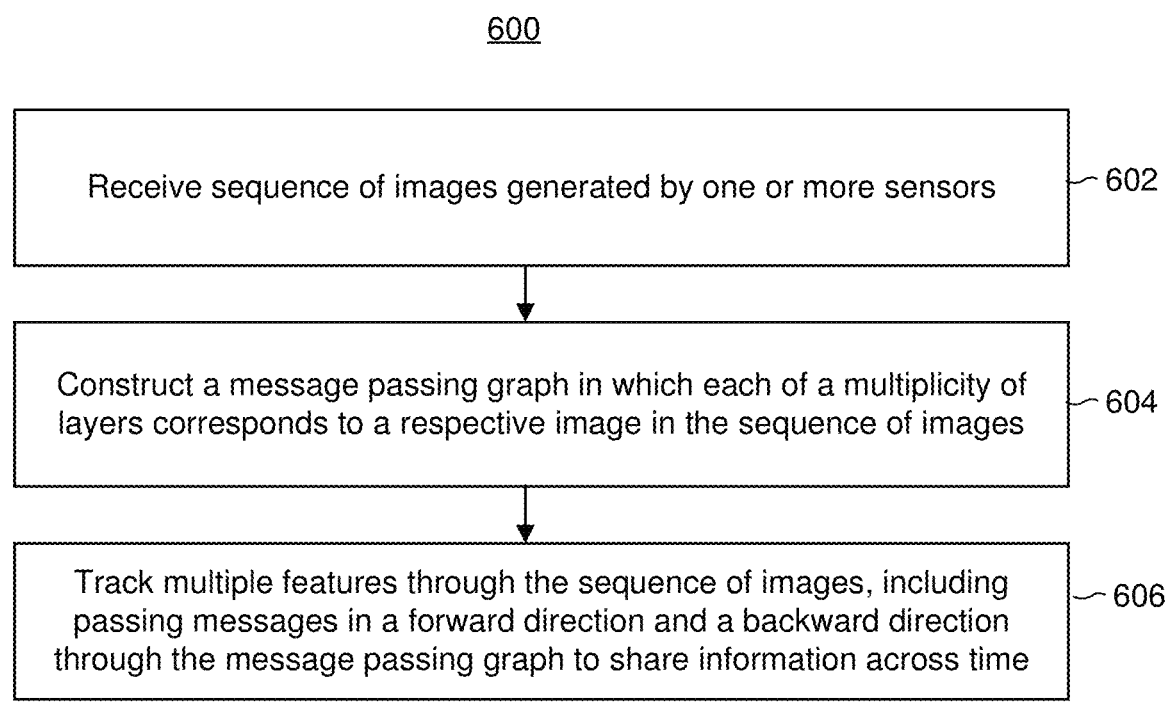
FIG. 6 illustrates a flowchart of an example method which a system of this disclosure can implement to track multiple objects.

For further clarity, FIG. 6 illustrates an example method 600 for multi-object tracking. The method 600 can be implemented as a set of instructions stored on a computer-readable medium and executed by one or more processors, or in another suitable manner. The method 600 can be implemented in the multi-object tracker 14 discussed above or in another suitable module or multiple modules. For convenience, FIG. 6 is discussed with reference to the multi-object tracker 14.

At block 602, the multi-object tracker 14 receives a sequence of images generated by one or more sensors. The sensors in various implementations can include one or more lidar sensor, one or more cameras (e.g., CMOS cameras), one or more radars, or a combination of sensors of different types if, for example, sensor fusion is used.

At block 604, the multi-object tracker 14 constructs a message passing graph in which each of a multiplicity of layers corresponds to a respective image in the sequence of images. Next, at block 606, the multi-object tracker 14 tracks multiple features through the sequence of images, including passing messages in a forward direction and a backward direction through the message passing graph to share information across time.

Figure 7:
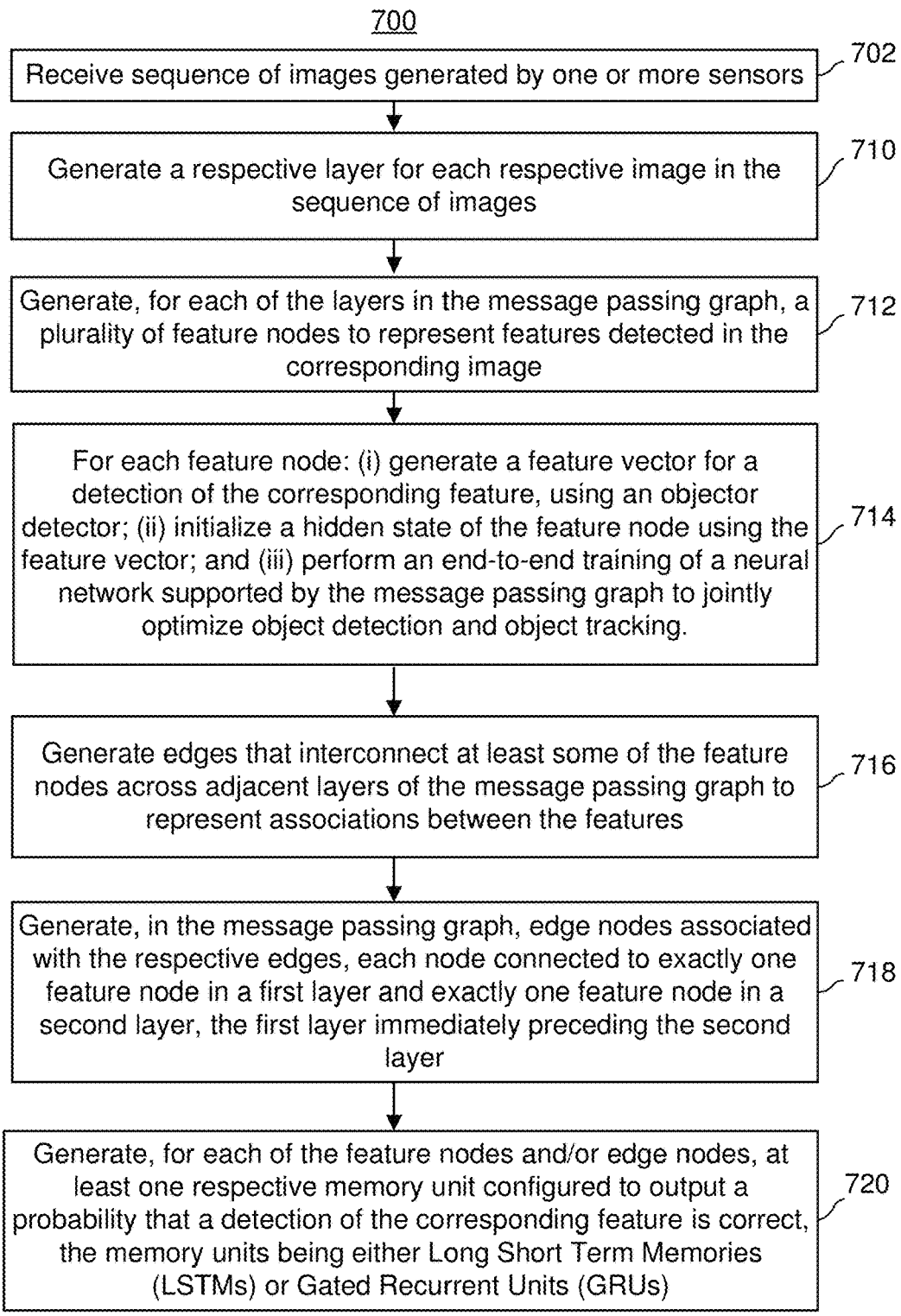
FIG. 7 illustrates a flowchart of an example method for constructing a message passing graph of this disclosure.

Next, FIG. 7 illustrates an example method 700 for constructing a message passing graph, such as the graph 50 or 70 of the examples above. Similar to the method 600, the method 700 can be implemented as a set of instructions stored on a computer-readable medium and executed by one or more processors, for example, and can be implemented in the multi-object tracker 14 or another suitable module(s).

At block 702, the multi-object tracker 14 receives a sequence of images generated by one or more sensors, similar to block 602 discussed above.

At block 710, the multi-object tracker 14 generates layers of a message passing graph, so that each of a multiplicity of layers corresponds to a respective image in the sequence of images. Next, at block 712, for each of the layers in the message passing graph, the multi-object tracker 14 generates multiple feature nodes to represent features detected in the corresponding image. Then, at block 714, for each feature node, the multi-object tracker 14: (i) generates a feature vector for a detection of the corresponding feature, using an objector detector; (ii) initializes a hidden state of the feature node using the feature vector; and (iii) performs an end-to-end training of a neural network supported by the message passing graph to jointly optimize object detection and object tracking.

At block 716, the multi-object tracker 14 generates edges that interconnect at least some of the feature nodes across adjacent layers of the message passing graph to represent associations between the features. Then, at block 718, the multi-object tracker 14 generates edge nodes in the message passing graph. The edge nodes are associated with the respective edges, and each node connects to exactly one feature node in a first layer and exactly one feature node in a second layer, the first layer immediately preceding the second layer.

At block 720, for each of the feature nodes and/or edge nodes, the multi-object tracker 14 configures at least one respective memory unit to output a probability that a detection of the corresponding feature is correct, the memory units being either Long Short Term Memories (LSTMs) or Gated Recurrent Units (GRUs).

Figure 8:
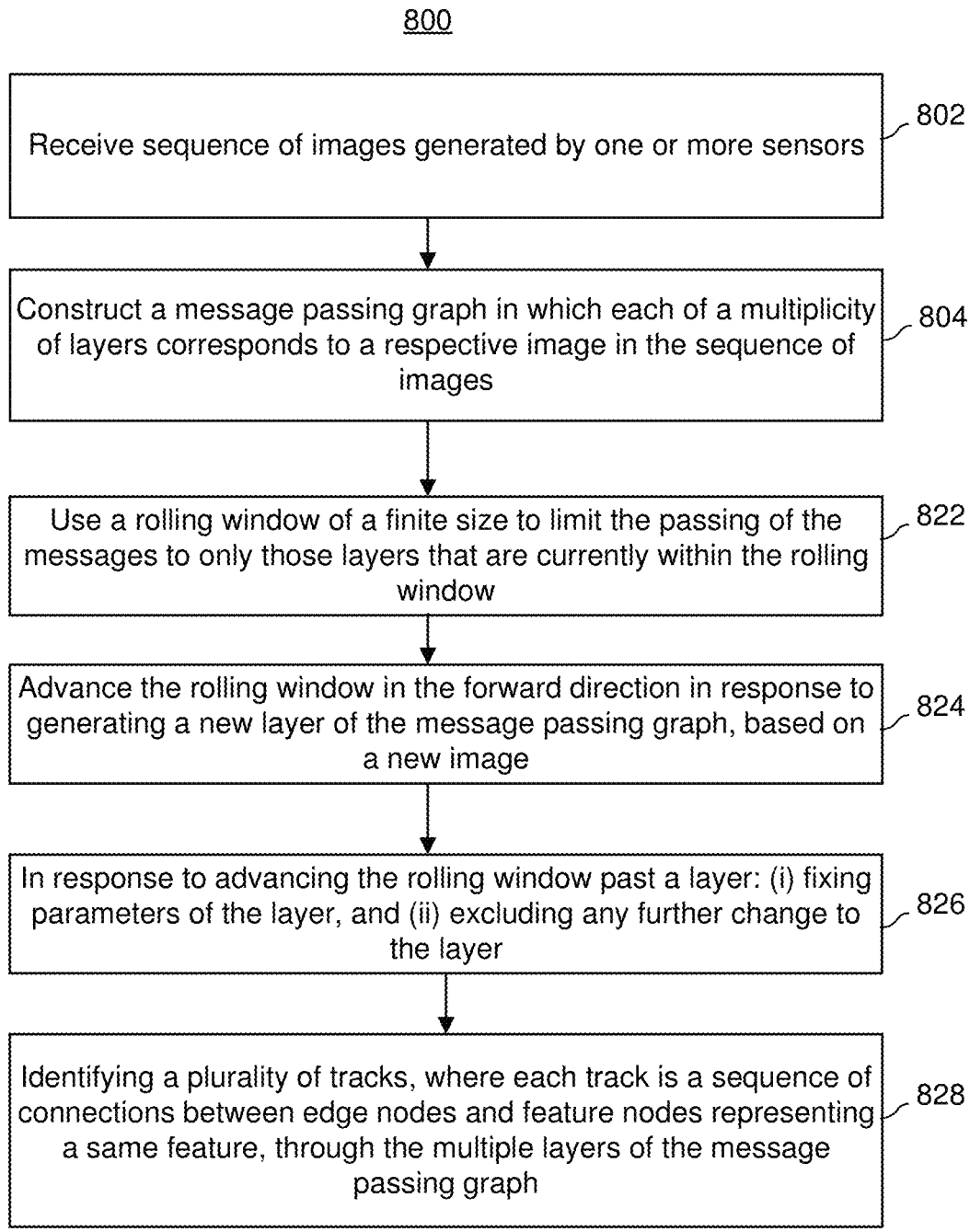
FIG. 8 illustrates a flowchart of an example method for tracking features through the sequence of images using the techniques of this disclosure.

Next, FIG. 8 illustrates an example method 800 for constructing tracks through a message passing graph, such as the graph 50 or 70 of the examples above, which also can be implemented in the multi-object tracker 14. At block 802, the multi-object tracker 14 receives a sequence of images generated by one or more sensors. At block 804, the multi-object tracker 14 constructs a message passing graph in which each of a multiplicity of layers corresponds to a respective image in the sequence of images.

At block 822, the multi-object tracker 14 uses a rolling window of a finite size to limit the passing of the messages to only those layers that are currently within the rolling window. At block 824, the multi-object tracker 14 advances the rolling window in the forward direction in response to generating a new layer of the message passing graph, based on a new image.

At block 826, in response to advancing the rolling window past a layer, the multi-object tracker 14 (i) fixes parameters of the layer, and (ii) excludes any further change to the layer. At block 828, the multi-object tracker 14 identifies multiple tracks within the message passing graph, where each track is a sequence of connections between edge nodes and feature nodes representing a same feature.

Figure 9:
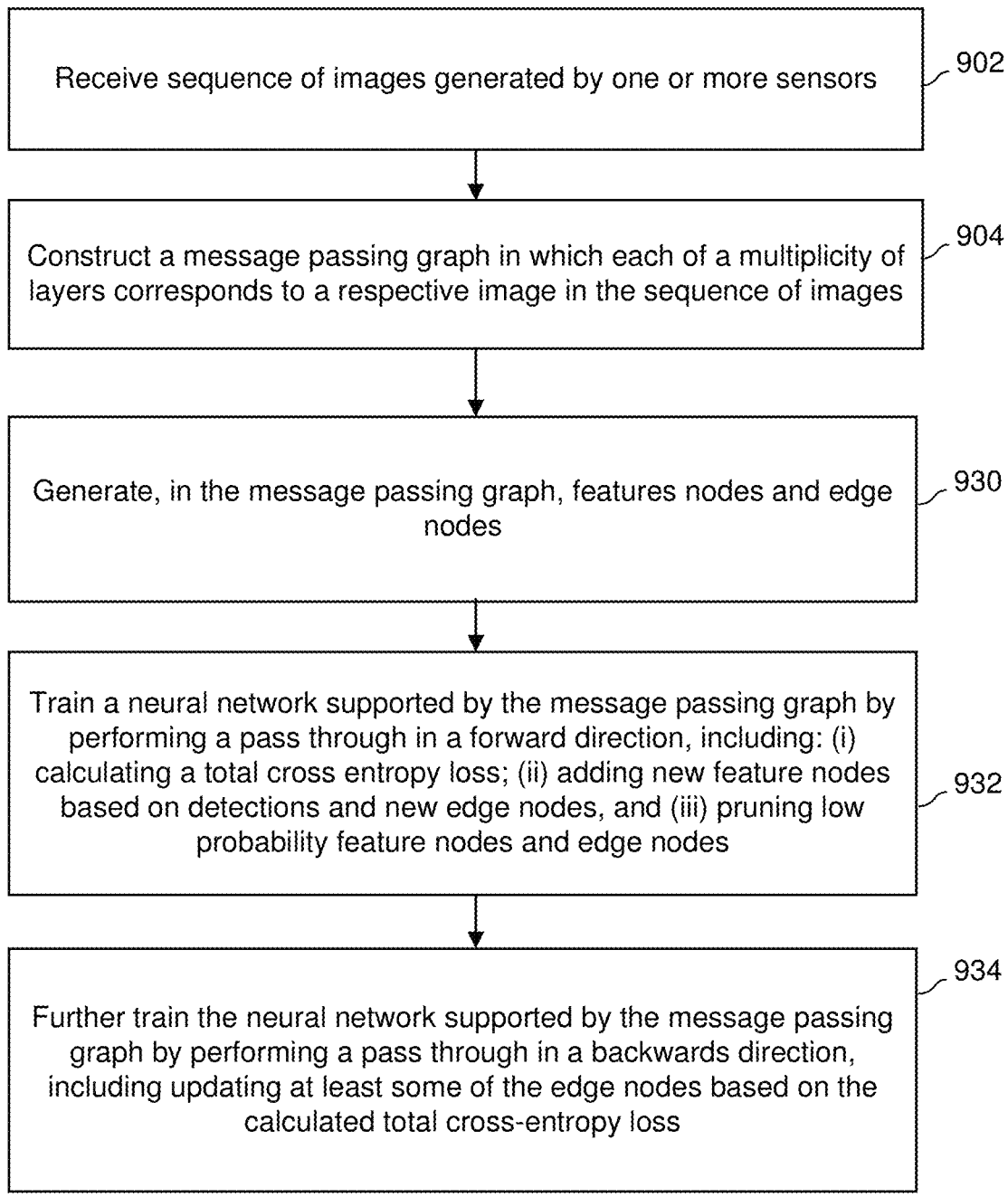
FIG. 9 illustrates a flowchart of an example method for training a neural network that includes a message passing graph of this disclosure.

FIG. 9 illustrates a method 900 for training a neural network, which also can be implemented in the multi-object tracker 14.

At block 902, the multi-object tracker 14 receives a sequence of images generated by one or more sensors. The multi-object tracker 14 then constructs a message passing graph in which each of a multiplicity of layers corresponds to a respective image in the sequence of images, at block 906. At block 930, the multi-object tracker 14 generates feature and edge nodes in the message passing graph, similar to the examples above.

At block 930, the multi-object tracker 14 trains a neural network supported by the message passing graph. To this end, the multi-object tracker 14 can perform a pass through the graph in a forward direction, including: (i) calculate a total cross entropy loss; (ii) add new feature nodes based on detections and new edge nodes, and (iii) prunce low probability feature nodes and edge nodes. At block 932, the multi-object tracker 14 further trains the neural network supported by the message passing graph by performing a pass through in a backwards direction, including updating at least some of the edge nodes based on the calculated total cross-entropy loss.

Figure 10:
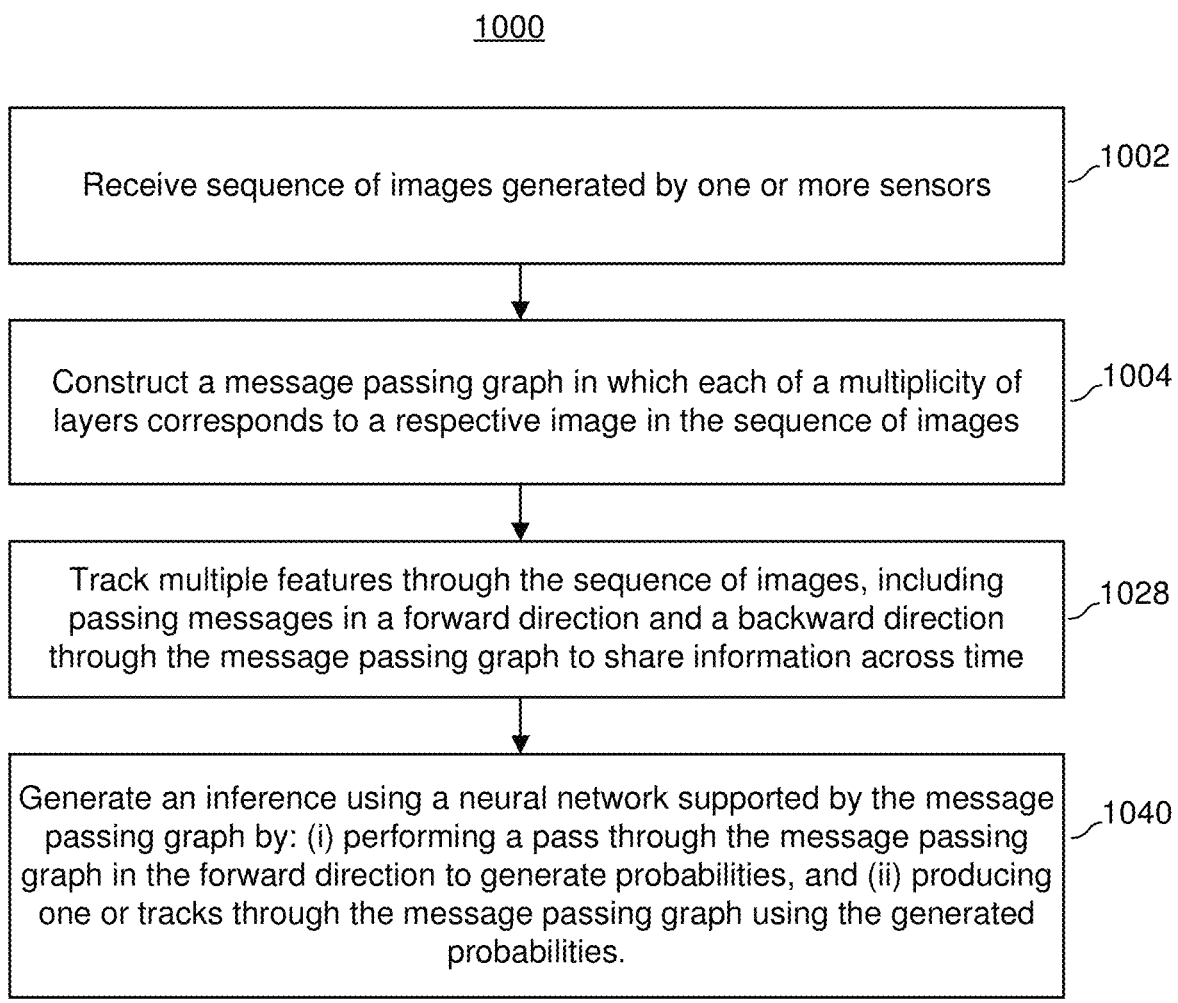
FIG. 10 illustrates a flowchart of an example method for generating inferences from the sequence of images using a message passing graph of this disclosure.

Finally, FIG. 10 illustrates an example method 1000 for generating inferences from the sequence of images, which also can be implemented in the multi-object tracker 14.

At block 1002, the multi-object tracker 14 receives a sequence of images generated by one or more sensors. At block 1004, the multi-object tracker 14 constructs a message passing graph in which each of a multiplicity of layers corresponds to a respective image in the sequence of images. At block 1028, the multi-object tracker 14 tracks multiple features through the sequence of images, including passing messages in a forward direction and a backward direction through the message passing graph to share information across time, as discussed above.

At block 1040, the multi-object tracker 14 generates an inference using a neural network supported by the message passing graph by (i) performing a pass through the message passing graph in the forward direction to generate probabilities, and (ii) producing one or tracks through the message passing graph using the generated probabilities.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A method of multi-object tracking, the method comprising:
   receiving, by processing hardware, a sequence of images generated at respective times by one or more sensors configured to sense an environment through which objects are moving relative to the one or more sensors;
   constructing, by the processing hardware, a message passing graph in which each of a multiplicity of layers corresponds to a respective one in the sequence of images, the constructing including:
      generating, for each of the layers, a plurality of feature nodes to represent features detected in the corresponding image, and
      generating edges that interconnect at least some of the feature nodes across adjacent layers of the graph neural network to represent associations between the features; and
   tracking, by the processing hardware, multiple features through the sequence of images, including:
      passing messages in a forward direction and a backward direction through the message passing graph to share information across time,
      limiting the passing of the messages to only those layers that are currently within a rolling window of a finite size, and
      advancing the rolling window in the forward direction in response to generating a new layer of the message passing graph, based on a new image.

2. The method of claim 1, wherein constructing the message passing graph further includes:
   generating edge nodes associated with the respective edges, each node connected to exactly one feature node in a first layer and exactly one feature node in a second layer, the first layer immediately preceding the second layer.

3. The method of claim 2, including passing the messages from feature nodes to edge nodes.

4. The method of claim 2, wherein the tracking includes:
   identifying a plurality of tracks, wherein each track is a sequence of connections between edge nodes and feature nodes representing associated features of a same object, through the multiple layers of the message passing graph.

5. The method of claim 2, wherein constructing the message passing graph further includes:
   generating, for each of the feature nodes, at least one respective memory unit configured to output a probability that a detection of the corresponding feature is correct; and
   generating, for each of the edge nodes, at least one respective memory unit configured to output a probability that a connection between the two corresponding feature nodes is correct.

6. The method of claim 5, wherein the memory units are implemented as Long Short Term Memories (LSTMs).

7. The method of claim 5, wherein the memory units are implemented as Gated Recurrent Units (GRUs).

8. The method of claim 1, wherein the tracking further includes:
   in response to advancing the rolling window past a layer: (i) fixing parameters of the layer, and (ii) excluding any further change to the layer.

9. The method of claim 1, wherein the size of the rolling window is between 3 and 10, measured in a number of layers.

10. The method of claim 1, further comprising:
training a neural network supported by the message passing graph, the training including:
performing a pass through the message passing graph in the forward direction, including calculating a total cross-entropy loss; and
performing a pass through the message passing graph in the backward direction, including updating at least some of the edge nodes based on the calculated total cross-entropy loss.

11. The method of claim 10, wherein performing the pass in the forward direction includes adding new feature nodes based on detections and new edge nodes.

12. The method of claim 10, wherein performing the pass in the forward direction includes pruning low-probability feature nodes and edge nodes.

13. The method of claim 1, further comprising:
generating an inference using a neural network supported by the message passing graph, the generating including:
performing a pass through the message passing graph in the forward direction to generate probabilities, and
producing one or more tracks through the message passing graph using the generated probabilities.

14. The method of claim 1, wherein the constructing further includes, for each feature node:
generating a feature vector for a detection of the corresponding feature, using an objector detector;
initializing a hidden state of the feature node using the feature vector; and
performing an end-to-end training of a neural network supported by the message passing graph to jointly optimize object detection and object tracking.

15. The method of claim 1, wherein receiving the sequence of images includes receiving sensor data from at least one of a LIDAR or a camera.

16. The method of claim 15, wherein each of the plurality features represents a cluster of pixels.

17. A non-transitory computer-readable medium storing thereon instructions executable by one or more processors to implement a multi-object tracking architecture for multi-object tracking, the multi-object tracking architecture being configured to:
receive a sequence of images generated at respective times by one or more sensors configured to sense an environment through which objects are moving relative to the one or more sensors;
construct a message passing graph in which each of a multiplicity of layers corresponds to a respective one in the sequence of images, the constructing including:
generating, for each of the layers, a plurality of feature nodes to represent features detected in the corresponding image, and
generating edges that interconnect at least some of the feature nodes across adjacent layers of the graph neural network to represent associations between the features; and
track multiple features through the sequence of images, including:
pass messages in a forward direction and a backward direction through the message passing graph to share information across time, and
limit the passing of the messages to only those layers that are currently within a rolling window of a finite size,
wherein the size of the rolling window is between 3 and 10, measured in a number of layers.

18. The non-transitory computer-readable medium of claim 17, wherein the multi-tracking architecture is configured to construct the message passing graph by:
generating edge nodes associated with the respective edges, each node connected to exactly one feature node in a first layer and exactly one feature node in a second layer, the first layer immediately preceding the second layer.

19. A method of multi-object tracking, the method comprising:
receiving, by processing hardware, a sequence of images generated at respective times by one or more sensors configured to sense an environment through which objects are moving relative to the one or more sensors;
constructing, by the processing hardware, a message passing graph in which each of a multiplicity of layers corresponds to a respective one in the sequence of images, the constructing including:
generating, for each of the layers, a plurality of feature nodes to represent features detected in the corresponding image, and
generating edges that interconnect at least some of the feature nodes across adjacent layers of the graph neural network to represent associations between the features;
training a neural network supported by the message passing graph, the training including:
performing a pass through the message passing graph in a forward direction, including: (i) calculating a total cross-entropy loss and (ii) adding new feature nodes based on detections and new edge nodes, and
performing a pass through the message passing graph in a backward direction, including updating at least some of the edge nodes based on the calculated total cross-entropy loss, the method further comprising:
tracking, by the processing hardware, multiple features through the sequence of images, including passing messages in the forward direction and the backward direction through the message passing graph to share information across time.

20. A method of multi-object tracking, the method comprising:
receiving, by processing hardware, a sequence of images generated at respective times by one or more sensors configured to sense an environment through which objects are moving relative to the one or more sensors;
constructing, by the processing hardware, a message passing graph in which each of a multiplicity of layers corresponds to a respective one in the sequence of images, the constructing including:
generating, for each of the layers, a plurality of feature nodes to represent features detected in the corresponding image, and
generating edges that interconnect at least some of the feature nodes across adjacent layers of the graph neural network to represent associations between the features;
training a neural network supported by the message passing graph, the training including:
performing a pass through the message passing graph in a forward direction, including: (i) calculating a total cross-entropy loss and (ii) pruning low-probability feature nodes and edge nodes, and
performing a pass through the message passing graph in a backward direction, including updating at least some of the edge nodes based on the calculated total cross-entropy loss, the method further comprising:

tracking, by the processing hardware, multiple features through the sequence of images, including passing messages in a forward direction and a backward direction through the message passing graph to share information across time.

* * * * *